US008844656B2

(12) United States Patent
Peterson

(10) Patent No.: US 8,844,656 B2
(45) Date of Patent: Sep. 30, 2014

(54) SEAL ASSEMBLY FOR A ROTARY EARTH BIT

(75) Inventor: Gregory W. Peterson, Mesa, AZ (US)

(73) Assignee: Atlas Copco Secoroc LLC, Grand Prairie, TX (US)

( * ) Notice: Subject to any disclaimer, the term of this patent is extended or adjusted under 35 U.S.C. 154(b) by 0 days.

(21) Appl. No.: 12/404,966

(22) Filed: Mar. 16, 2009

(65) Prior Publication Data

US 2010/0230172 A1 Sep. 16, 2010

(51) Int. Cl.
*E21B 10/25* (2006.01)
*F16J 15/36* (2006.01)
*F16J 15/34* (2006.01)

(52) U.S. Cl.
CPC ............ *E21B 10/25* (2013.01); *F16J 15/344* (2013.01)
USPC ............ 175/371; 277/348; 277/349; 277/392

(58) Field of Classification Search
USPC .......................... 175/371; 277/348–349, 392
See application file for complete search history.

(56) References Cited

U.S. PATENT DOCUMENTS

| 2,272,650 | A | * | 2/1942 | Von Veh | 277/573 |
|---|---|---|---|---|---|
| 3,529,840 | A | * | 9/1970 | Kupfert et al. | 277/383 |
| 4,306,727 | A | * | 12/1981 | Deane et al. | 277/381 |
| 4,466,622 | A | * | 8/1984 | Deane et al. | 175/371 |
| 4,516,641 | A |   | 5/1985 | Burr |   |
| 4,753,303 | A |   | 6/1988 | Burr |   |
| 4,762,189 | A |   | 8/1988 | Tatum |   |
| 4,824,123 | A | * | 4/1989 | Chia et al. | 277/382 |
| 5,005,989 | A |   | 4/1991 | Karlsson |   |
| 5,009,519 | A |   | 4/1991 | Tatum |   |
| 5,472,058 | A | * | 12/1995 | Hooper et al. | 175/371 |
| 5,570,750 | A |   | 11/1996 | Williams |   |
| 5,586,611 | A |   | 12/1996 | Dorosz |   |
| 5,725,312 | A | * | 3/1998 | May | 383/210 |
| 5,735,330 | A | * | 4/1998 | Buchmann et al. | 162/301 |
| 6,033,117 | A | * | 3/2000 | Cariveau et al. | 384/94 |
| 6,123,337 | A |   | 9/2000 | Fang et al. |   |
| 6,176,331 | B1 |   | 1/2001 | Jin et al. |   |
| 6,196,339 | B1 |   | 3/2001 | Portwood et al. |   |
| 6,254,275 | B1 |   | 7/2001 | Slaughter, Jr. et al. |   |
| 6,305,483 | B1 |   | 10/2001 | Portwood |   |
| 6,431,293 | B1 |   | 8/2002 | Portwood et al. |   |
| 6,513,607 | B2 |   | 2/2003 | Peterson et al. |   |
| 6,679,342 | B2 |   | 1/2004 | Portwood et al. |   |
| 6,695,079 | B2 |   | 2/2004 | Portwood et al. |   |
| 6,837,317 | B2 |   | 1/2005 | Byrd |   |
| 7,000,712 | B2 |   | 2/2006 | Byrd |   |
| 7,188,691 | B2 |   | 3/2007 | Yong et al. |   |
| 7,347,290 | B2 |   | 3/2008 | Yu et al. |   |
| 7,392,862 | B2 |   | 7/2008 | Zahradnik et al. |   |
| 2002/0108788 | A1 | * | 8/2002 | Peterson et al. | 175/228 |
| 2005/0103531 | A1 | * | 5/2005 | Byrd | 175/371 |
| 2006/0032673 | A1 | * | 2/2006 | Yong et al. | 175/372 |

(Continued)

FOREIGN PATENT DOCUMENTS

JP 02024475 A * 1/1990 ............. E21B 10/50

*Primary Examiner* — Jennifer H Gay
(74) *Attorney, Agent, or Firm* — Schmeiser, Olsen & Watts LLP

(57) ABSTRACT

An earth bit includes a cutting cone carried by a lug, and an interstice seal assembly which forms a dynamic seal with a radial interstice lug surface of the lug. The interstice seal assembly includes a rigid sealing ring having lengthened and shortened arm portions. The lengthened arm portion extends outwardly from the shortened arm portion, and engages the radial interstice lug surface.

22 Claims, 19 Drawing Sheets

(56) References Cited

U.S. PATENT DOCUMENTS

| | | |
|---|---|---|
| 2008/0041634 A1 | 2/2008 | Peterson |
| 2008/0041635 A1* | 2/2008 | Peterson .................. 175/371 |
| 2008/0179103 A1* | 7/2008 | Langford et al. ............ 175/371 |
| 2009/0062738 A1* | 3/2009 | Ziegler ........................ 604/151 |
| 2010/0102513 A1* | 4/2010 | Peterson ...................... 277/336 |
| 2010/0230172 A1* | 9/2010 | Peterson ...................... 175/371 |

* cited by examiner

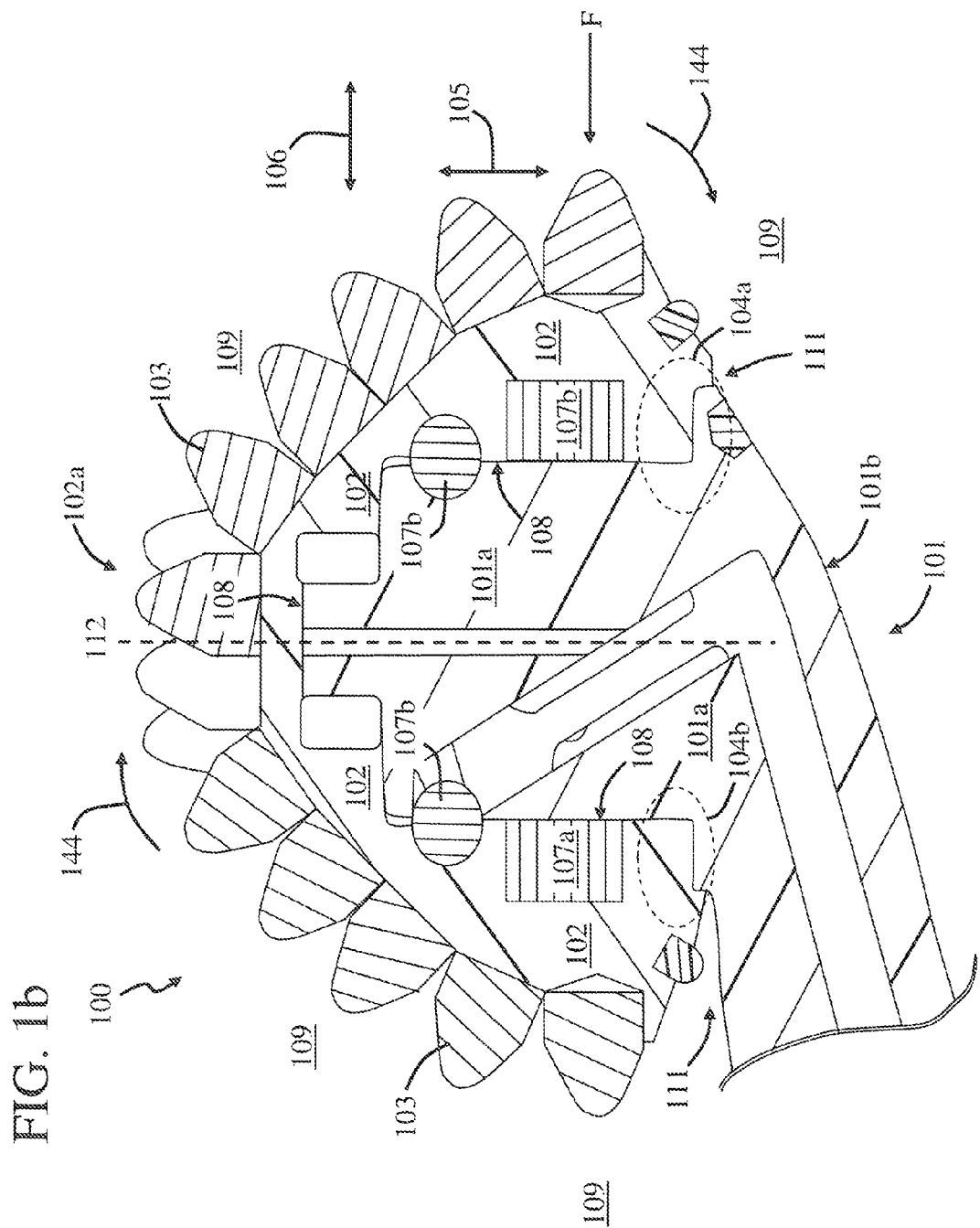

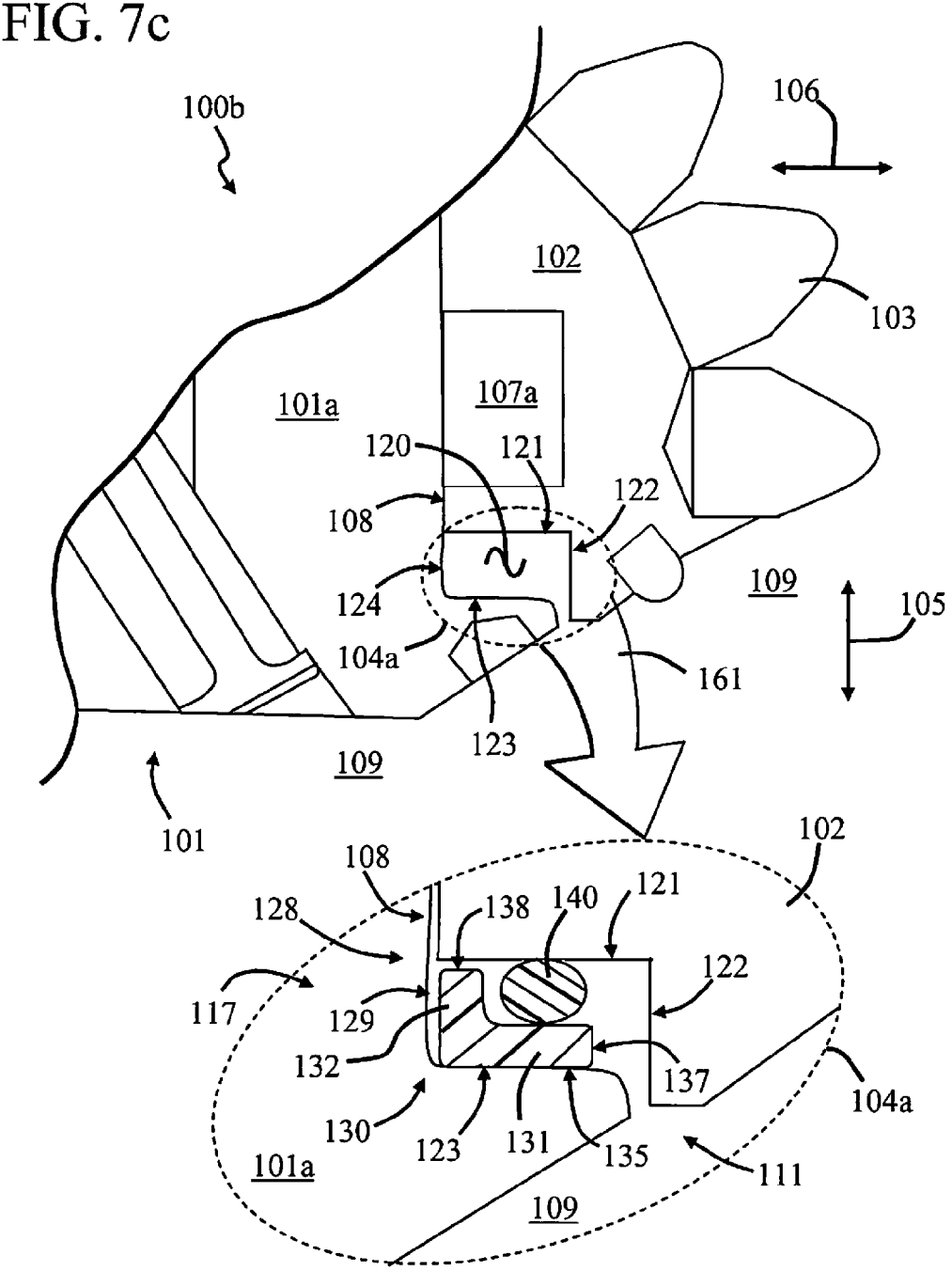

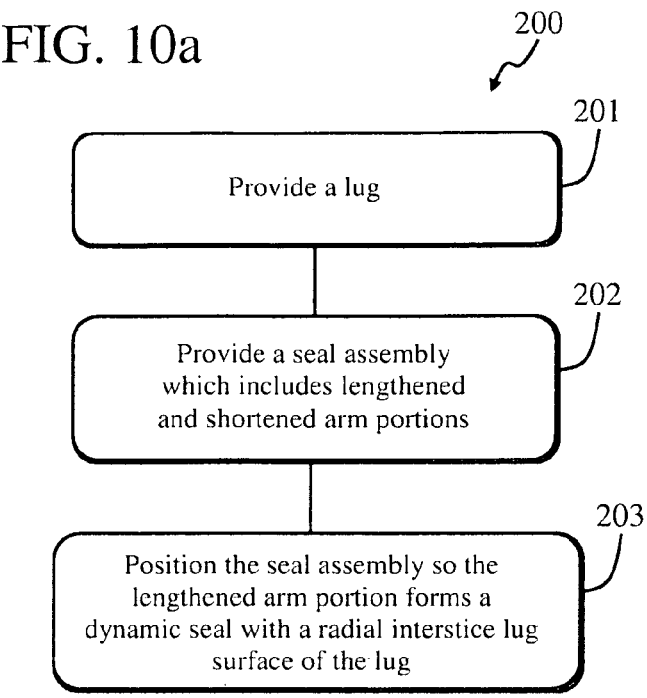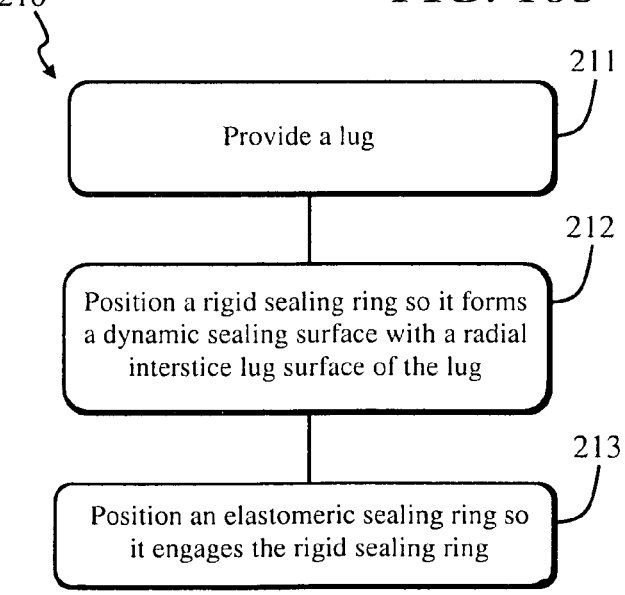

SEAL ASSEMBLY FOR A ROTARY EARTH BIT

BACKGROUND OF THE INVENTION

1 Field of the Invention

This invention relates generally to a seal assembly for providing a seal between a lug and cutting cone of a rotary earth bit.

2. Description of the Related Art

An earth bit is commonly used to bore holes into a formation. Such holes may be bored for many different reasons, such as drilling for oil, minerals and geothermal steam. There are several different types of earth bits that are used to bore holes. One type is a rotary earth bit and, in a typical setup, it includes three cutting cones rotatably mounted to a corresponding lug. The lugs are connected together to form an earth bit body and, as the earth bit body is rotated in the bore hole, the cutting cones rotate in response to contacting the formation.

In normal use, the earth bit contacts rock formations while being exposed to extreme conditions, such as high temperatures and pressures. As a result, the earth bit tends to wear down. A journal segment of the lug is especially prone to wearing down because of friction between the journal segment and corresponding cutting cone. Lubricant is typically retained, with an earth bit seal, between the lug and cutting cone to reduce the friction between the lug and cutting cone. The earth bit seal also restricts the flow of debris to the region between the lug and cutting cone, which reduces the friction between them. Retaining lubricant between the lug and cutting cone, as well as keeping debris from between the lug and cutting cone, increases the life of the earth bit.

The earth bit seal is generally in rotating contact with the lug and/or cutting cone. The surface portion of the earth bit seal in rotating contact with the lug or cutting cone is known as a dynamic sealing surface. The earth bit seal and cutting cone form a dynamic seal when the earth bit seal and cutting cone are in rotating contact with each other. Further, the earth bit seal and lug form a dynamic seal when the earth bit seal and lug are in rotating contact with each other. The surface portion of the earth bit seal in non-rotating contact with the earth bit lug or cutting cone is known as a static sealing surface. The earth bit seal and cutting cone form a static seal when the earth bit seal and cutting cone are in non-rotating contact with each other. Further, the earth bit seal and lug form a static seal when the earth bit seal and lug are in non-rotating contact with each other.

Example of various types of earth bit seals are disclosed in U.S. Pat. Nos. 7,347,290, 7,188,691, 7,392,862, 7,000,712, 6,837,317, 6,695,079, 6,679,342, 6,431,293, 6,196,339, 6,033,117, 6,513,607, 6,305,483, 6,254,275, 6,176,331, 6,123,337, 5,586,611, 5,570,750, 5,009,519, 4,762,189, 5,005,989, 4,753,303, 4,516,641, as well as in U.S. Patent Application No. 20080041634.

One type of earth bit seal includes an elastomeric sealing ring, such as an O-ring seal. The elastomeric sealing ring typically experiences the extreme conditions mentioned above, which can cause it to become impregnated with debris, especially if the elastomeric sealing ring forms a part of the dynamic seal. An elastomeric sealing ring impregnated with debris is more likely to tear and lose elastomeric material, which inhibits its ability to form a seal. Further, an elastomeric sealing ring impregnated with debris operates as an abrasive ring which can undesirably remove material from the lug or cutting cone it is dynamically sealed with. A groove in the lug or cutting cone is often formed in response to the material being removed from the lug or cutting cone by an elastomeric sealing ring impregnated with debris. It is more difficult for the elastomeric sealing ring to provide a seal between the lug or cutting cone if a groove is undesirably formed in the lug or cutting cone.

Another type of earth bit seal includes a metal face seal engaged with an elastomeric sealing ring. In a typical setup, the metal face seal dynamically engages a surface of either the lug or cutting cone, or another metal face seal. Further, a static seal is typically formed between the metal face seal and elastomeric sealing ring. The metal face seal protects the elastomeric sealing ring from becoming impregnated with debris. Hence, the metal face seal reduces the amount of elastomeric material removed from the elastomeric sealing ring. The metal face seal does not become impregnated with debris as easily as seals which include elastomeric materials. Hence, the metal face seal is less likely to operate as an abrasive ring and remove material from the cutting cone or lug it is dynamically sealed with.

It is known that the cutting cone experiences a certain amount of torque in response to engaging the formation. The torque experienced by the cutting cone in response to engaging the formation causes the tip of the cone to rotate downwardly and outwardly relative to the lug. The amount of torque experienced by the cutting cone in response to engaging the formation is increased in response to seating the cutting cone further away from a rear portion of the lug. Further, the amount of torque experienced by the cutting cone in response to engaging the formation is reduced in response to seating the cutting cone closer to the rear portion of the lug. The cutting cone can be seated closer to the rear portion of the lug by reducing the amount of axial space occupied by the earth bit seal. Hence, it is desirable to provide a seal assembly which occupies a smaller amount of axial space.

BRIEF SUMMARY OF THE INVENTION

The present invention is generally directed to a seal assembly for an earth bit. The drawings and the following description provide an enabling disclosure and the appended claims particularly point out and distinctly claim disclosed subject matter and equivalents thereof.

BRIEF DESCRIPTION OF THE DRAWINGS

FIG. 1b is a cut-away side view of the rotary earth bit of FIG. 1a taken along a cut-line I-I of FIG. 1a.

FIG. 2b is a close-up view of the seal region of FIG. 1b showing an interstice seal assembly positioned in the interstice of FIG. 2a.

FIG. 3b is a cut-away perspective view of the interstice seal assembly of FIG. 2b taken along a cut-line III-III of FIG. 3a.

FIG. 4b is a cut-away perspective view of the rigid sealing ring of FIG. 2b taken along a cut-line IV-IV of FIG. 4a.

FIG. 5b is a cut-away perspective view of the elastomeric sealing ring of FIG. 2b taken along a cut-line V-V of FIG. 5a.

FIG. 7c is a close-up view of the single seal rotary earth bit of FIGS. 7a and 7b showing the rigid sealing ring.

FIG. 7e is a close-up view of the elastomeric sealing ring of the interstice seal assembly of FIG. 7c in more detail.

FIG. 9b is a cut-away perspective view of the elastomeric sealing ring of FIG. 9a taken along a cut-line IX-IX of FIG. 9a.

FIGS. 10a and 10b are flow diagrams of methods of providing a seal for an earth bit.

DETAILED DESCRIPTION OF THE INVENTION

Figure 1A:
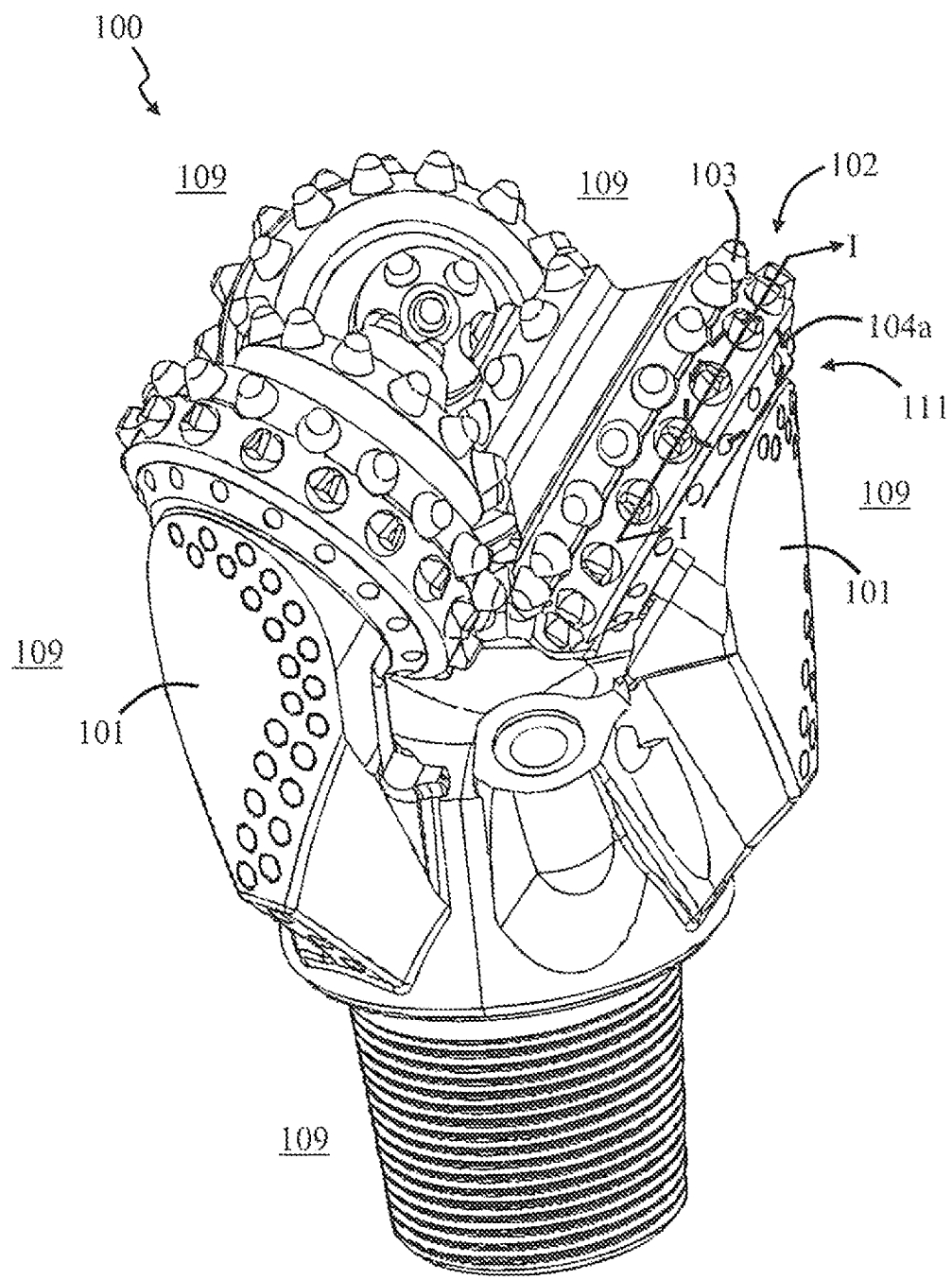
FIG. 1a is a perspective view of a rotary earth bit.

A seal assembly is used with an earth bit, such as a rotary earth bit. The rotary earth bit includes a cutting cone rotatably mounted to a lug. A lubricant chamber, which includes an internal region of the earth bit, extends between the cutting cone and lug. The lubricant chamber is formed in response to mounting the cutting cone to the lug. In particular, the lubricant chamber is formed in response to mounting the cutting cone to a journal segment of the lug. The seal assembly is positioned to restrict the flow of lubricant from the lubricant chamber, and to restrict the flow of debris to the lubricant chamber.

The seal assembly includes an interstice seal assembly having a rigid sealing ring and elastomeric sealing ring, wherein the rigid sealing ring includes lengthened and shortened arm portions. As discussed in more detail below, the lengthened arm portion is longer than the shortened arm portion. Further, the lengthened arm portion extends away from the shortened arm portion so that the rigid sealing ring has an L-shaped cross-sectional shape.

The interstice seal assembly is positioned in an interstice of the lug and cutting cone. The interstice is formed in response to mounting the cutting cone with the lug. In particular, the interstice is formed in response to mounting the cutting cone with the journal segment of the lug. The interstice is bounded by axial and radial interstice lug surfaces of the lug, as well as axial and radial interstice cone surfaces of the cutting cone. In this way, the interstice is between the lug and cutting cone. It should be noted that a portion of the interstice is typically bounded by a portion of the journal segment. For example, the axial and/or radial interstice lug surfaces can be surfaces of the journal segment. Further, it should be noted that the interstice is an annular interstice which extends around the journal segment, and is between the journal segment and cutting cone.

As discussed in more detail below, the radial interstice lug surface is a surface of the lug which extends in a radial direction of the journal segment, and forms a portion of the interstice of the lug and cutting cone. The radial interstice lug surface is a surface of the lug which does not form a portion of a groove of the lug or cutting cone. More information regarding interstices and grooves can be found in U.S. Pat. No. 6,033,117, the contents of which are incorporated herein by reference.

The axial interstice lug surface is a surface of the lug which extends in an axial direction of the journal segment, and forms a portion of the interstice of the lug and cutting cone. The axial interstice lug surface is a surface of the lug which does not form a portion of a groove of the lug or cutting cone.

The radial interstice cone surface is a surface of the cutting cone which extends in a radial direction of the cutting cone and forms a portion of the interstice of the lug and cutting cone. The radial interstice cone surface is a surface of the cutting cone which does not form a portion of a groove of the lug or cutting cone. It should be noted that the radial interstice surfaces of the lug and cutting cone are opposed to each other when the cutting cone is mounted with the lug. Further, the radial interstice surfaces of the lug and cutting cone face each other when the cutting cone is mounted with the lug.

The axial interstice cone surface is a surface of the cutting cone which extends in an axial direction of the cutting cone and forms a portion of the interstice of the lug and cutting cone. The axial interstice cone surface is a surface of the cutting cone which does not form a portion of a groove of the lug or cutting cone. It should be noted that the axial interstice surfaces of the lug and cutting cone are opposed to each other when the cutting cone is mounted with the lug. Further, the axial interstice surfaces of the lug and cutting cone face each other when the cutting cone is mounted with the lug.

It should also be noted that the radial directions of the journal segment and cutting cone are typically parallel with each other when the cutting cone is mounted with the journal segment. Further, the axial directions of the journal segment and cutting cone are typically parallel with each other when the cutting cone is mounted with the journal segment.

In some embodiments, the seal assembly includes a groove seal assembly having an elastomeric sealing ring positioned in a lug groove of the lug. The lug groove is a groove of the lug because it extends through the lug. The lug groove does not extend through the cutting cone. In particular, the lug groove is a groove of the lug because it extends through the journal segment of the lug. In other embodiments, the seal assembly includes a groove seal assembly having an elastomeric sealing ring positioned in a cone groove of the cutting cone. The cone groove is a groove of the cutting cone because it extends through the cutting cone. The cone groove does not extend through the lug. It should be noted that, in some embodiments, the earth bit includes groove and cone seal assemblies extending through the lug and cone grooves, respectively.

The interstice seal assembly is positioned in the interstice so the lengthened arm portion of the rigid sealing ring extends along the radial interstice lug surface. The interstice seal assembly is positioned in the interstice so the lengthened arm portion faces the radial interstice lug surface. The lengthened arm portion extends along and faces the radial interstice lug surface so that a dynamic seal can be formed between them.

The dynamic seal is formed in response to mounting the interstice seal assembly with the lug. In particular, the dynamic seal is formed in response to mounting the rigid sealing ring with the journal segment of the lug so the lengthened arm portion engages the radial interstice lug surface. The interstice seal assembly can be mounted with the lug in many different ways. In some embodiments, the interstice seal assembly is mounted with the lug by extending the journal segment through a central opening of the interstice seal assembly. In this embodiment, the cutting cone is mounted with the lug so it engages the interstice seal assembly. In other embodiments, the elastomeric and rigid sealing rings are engaged together and positioned so they are carried by the cutting cone. In this embodiment, the journal segment is extended through a central opening of the interstice seal assembly and cutting cone.

The interstice seal assembly is positioned in the interstice so the shortened arm portion of the rigid sealing ring extends along the axial interstice lug surface. In some embodiments, the interstice seal assembly is positioned in the interstice so the shortened arm portion faces the axial interstice lug surface. The shortened arm portion extends along and faces the axial interstice lug surface so that a dynamic seal can be formed between them. In some embodiments, the shortened arm portion engages the axial interstice lug surface and, in other embodiments, the shortened arm portion is spaced from the axial interstice lug surface. In some embodiments, the shortened arm portion is positioned towards the axial interstice lug surface and, in other embodiments, the shortened arm portion is positioned away from the axial interstice lug surface. Further, the shortened arm portion extends away from the radial interstice lug surface. The shortened arm portion extends away from the radial interstice lug surface because, as mentioned above, the rigid sealing ring has an L-shaped cross-sectional shape, and the lengthened arm portion extends outwardly from the shortened arm portion.

The interstice seal assembly is positioned in the interstice so the lengthened arm portion extends along the radial interstice lug surface and the shortened arm portion extends parallel to the axial interstice lug surface. When the seal assembly is mounted to the journal segment, the lengthened arm portion extends radially from the journal segment and the shortened arm portion extends axially along the journal segment. As discussed in more detail below, in some embodiments, the shortened arm portion is positioned proximate to the journal segment and, in other embodiments, the shortened arm portion is positioned away from the journal segment. In the embodiments in which the shortened arm portion is positioned away from the journal segment, the shortened arm portion is spaced from the journal segment by the lengthened arm portion.

As mentioned above, it is desirable to seat the cutting cone closer to the rear portion of the lug to reduce the amount of torque experienced by the cutting cone in response to engaging a formation. The cutting cone can be seated closer to the rear portion of the lug because the shortened arm portion extends axially along the journal segment and the lengthened arm portion extends radially from the journal segment. The shortened arm portion is shorter than the lengthened arm portion so that the seal assembly occupies less axial space and the cutting cone is positioned closer to the rear portion of the lug. The cutting cone experiences less torque in response to engaging the formation because the seal assembly occupies less axial space and the tip of the cone is closer to the rear portion of the lug. In this way, the seal assembly reduces the amount of torque experienced by the cutting cone in response to engaging the formation.

The interstice seal assembly also includes an elastomeric sealing ring engaged with the rigid sealing ring. The elastomeric sealing ring is positioned so that the rigid sealing ring is between the elastomeric sealing ring and lug. In particular, the elastomeric sealing ring is positioned so that the lengthened arm portion is between the elastomeric sealing ring and radial interstice lug surface, and the shortened arm portion is between the elastomeric sealing ring and axial interstice lug surface. In some embodiments, the elastomeric sealing ring is also positioned between the shortened arm portion and axial interstice cone surface. In other embodiments, the shortened arm portion is positioned between the shortened arm portion and axial interstice lug surface. Further, the elastomeric sealing ring is positioned between the lengthened arm portion and radial interstice cone surface. In this way, the elastomeric sealing ring is bounded by the lengthened arm portion, shortened arm portion, radial interstice cone surface and axial interstice cone surface.

The elastomeric sealing ring energizes the rigid sealing ring against the lug. In particular, the elastomeric sealing ring energizes the lengthened arm portion against the radial interstice lug surface. The lengthened arm portion is positioned between the elastomeric sealing ring and radial interstice lug surface. Further, the elastomeric sealing ring is positioned between the lengthened arm portion and radial interstice cone surface. The elastomeric sealing ring is positioned between the lengthened arm portion and radial interstice cone surface so the elastomeric sealing ring is engaged by the lengthened arm portion and radial interstice cone surface. The elastomeric sealing ring energizes the lengthened arm portion against the radial interstice lug surface in response to the elastomeric sealing ring being engaged by the lengthened arm portion and radial interstice cone surface. In this way, the elastomeric sealing ring energizes the rigid sealing ring against the lug.

The elastomeric sealing ring moves from an uncompressed condition to a compressed condition in response to positioning the elastomeric sealing ring between the lengthened arm portion and radial interstice cone surface. In particular, the elastomeric sealing ring moves from the uncompressed condition to the compressed condition in response to being engaged by the lengthened arm portion and radial interstice cone surface.

The elastomeric sealing ring pushes the lengthened arm portion against the radial interstice lug surface in response to mounting the cutting cone with the lug. In particular, the elastomeric sealing ring pushes the lengthened arm portion against the radial interstice lug surface in response to mounting the cutting cone with the lug by extending the journal segment through the central opening of the rigid and elastomeric sealing rings. The elastomeric sealing ring is typically compressed in response to mounting the cutting cone with the journal segment of the lug. Hence, the elastomeric sealing ring energizes the rigid sealing ring against the lug when it is in the compressed condition.

A pressure exists between the lengthened arm portion and radial interstice lug surface because the elastomeric sealing ring energizes the lengthened arm portion against the radial interstice lug surface. The pressure between the lengthened arm portion and radial interstice lug surface can be controlled in many different ways. For example, the pressure can be increased and decreased by decreasing and increasing, respectively, the length of the lengthened arm portion. Further, the pressure can be increased and decreased by increasing and decreasing, respectively, the hardness of the material of elastomeric sealing ring. The hardness of the material of elastomeric sealing ring can be changed by changing the durometer of the material used.

As discussed in more detail below, it is generally desirable for the elastomeric sealing ring to form a static seal with the rigid sealing ring and cutting cone. In particular, it is desirable for the elastomeric sealing ring to form a static seal with the lengthened arm portion and radial interstice cone surface. It is desirable for the elastomeric sealing ring to form a static seal with the rigid sealing ring and cutting cone so that the elastomeric sealing ring and rigid sealing ring do not rotate relative to the cutting cone. Further, it is desirable for the elastomeric sealing ring to form a static seal with the rigid sealing ring and cutting cone so that the elastomeric sealing ring and rigid sealing ring rotate relative to the lug in response to rotation of the cutting cone. The rigid sealing ring rotates relative to the lug so that a dynamic seal is formed therebetween. Hence, the interstice seal assembly is in non-rotating contact with the cutting cone and rotating contact with the lug. In this way, the interstice seal assembly forms static and dynamic seals with the cutting cone and lug, respectively.

As mentioned above, the interstice is formed in response to mounting the cutting cone with the lug. In particular, the interstice is formed in response to mounting the cutting cone with the journal segment of the lug. In some situations, the cutting cone is mounted with the journal segment after the journal segment has received the interstice seal assembly. In other situations, the interstice seal assembly is carried by the cutting cone, and the journal segment is extended through the interstice seal assembly to mount to the cutting cone. Hence, the interstice is formed in response to positioning the elastomeric sealing ring between the lengthened arm portion and radial interstice cone surface. Further, the interstice is formed in response to engaging the elastomeric sealing ring with the lengthened arm portion and radial interstice cone surface. The interstice is formed in response to moving the elastomeric sealing ring between the uncompressed and compressed conditions. In particular, the elastomeric sealing ring moves from the uncompressed condition to the compressed condition in response to forming the interstice.

As mentioned above, it is desirable for the elastomeric sealing ring to form static seals with the lengthened arm portion and radial interstice cone surface. The static seals are formed in response to positioning the elastomeric sealing ring between the lengthened arm portion and radial interstice cone surface. Further, the static seals are formed in response to engaging the elastomeric sealing ring with the lengthened arm portion and radial interstice cone surface. The static seals are formed in response to moving the elastomeric sealing ring between the uncompressed and compressed conditions. In particular, the elastomeric sealing ring moves from the uncompressed condition to the compressed condition in response to forming the static seals.

As mentioned above, the lubricant chamber is formed in response to mounting the cutting cone with the journal segment of the lug. In some situations, the cutting cone is mounted with the journal segment after the journal segment has received the interstice seal assembly. Hence, in these situations, the lubricant chamber is formed after the journal segment has received the interstice seal assembly. In other situations, the interstice seal assembly is carried by the cutting cone, and the journal segment is extended through the interstice seal assembly to mount to the cutting cone. Hence, in these situations, the lubricant chamber is formed after the interstice seal assembly is carried by the cutting cone. In either of these situations, the lubricant chamber is formed in response to positioning the elastomeric sealing ring between the lengthened arm portion and radial interstice cone surface. Further, the lubricant chamber is formed in response to engaging the elastomeric sealing ring with the lengthened arm portion and radial interstice cone surface. The lubricant chamber is formed in response to moving the elastomeric sealing ring between the uncompressed and compressed conditions. In particular, the elastomeric sealing ring moves from the uncompressed condition to the compressed condition in response to forming the lubricant chamber.

FIG. 1a is a perspective view of a rotary earth bit 100, and FIG. 1b is a cut-away side view of rotary earth bit 100 taken along a cut-line I-I of FIG. 1a. In this embodiment, rotary earth bit 100 is a tri-cone rotary earth bit and includes three lugs 101. However, only two lugs are shown in the perspective view of FIG. 1a.

As shown in FIGS. 1a and 1b, a cutting cone 102, having cutting cone teeth 103, is rotatably mounted to a journal segment 101a (FIG. 1b) of each lug 101. In this way, rotary earth bit 100 includes a cutting cone carried by a lug. Cutting cone 102 and journal segment 101a bound an internal region 108, which is positioned between them and operates as a lubricant chamber. Rotary earth bit 100 can include one or more roller bearings 107a and/or ball bearings 107b in fluid communication with internal region 108. Roller bearings 107a and ball bearings 107b facilitate the rotation of cutting cone 102 relative to lug 101. In particular, roller bearings 107a and ball bearings 107b facilitate the rotation of cutting cone 102 relative to journal segment 101a about a rotation axis 112 (FIG. 1b). In this embodiment, rotation axis 112 extends through a center of cutting cone 102, and cutting cone 102 rotates about rotation axis 112. In some embodiments, lug 101 and cutting cone 102 are coupled together with a journal bearing, such as the journal bearing disclosed in U.S. Pat. Nos. 6,691,804 and 7,182,154, the contents of which are incorporated herein by reference.

An interstice seal assembly (not shown) of the seal assembly is typically positioned in a seal region, a portion of which is indicated as seal regions 104a and 104b (FIG. 1b), to restrict the flow of lubricant from internal region 108 to an external region 109 through an opening 111 (FIGS. 1a and 1b). It should be noted that external region 109 is external to rotary earth bit 100, and opening 111 is an annular opening which extends around journal segment 101a and is between journal segment 101a and cutting cone 102. Opening 111 is formed in response to mounting cutting cone 102 with journal segment 101a. The lubricant lubricates roller bearings 107a and ball bearings 107b to reduce the amount of friction between them and lug 101 and cutting cone 102. The seal assembly also restricts the flow of debris from external region 109 to internal region 108 through opening 111. In this way, the seal assembly restricts the flow of material between internal region 108 and external region 109.

It is typically desirable for the interstice seal assembly to rotate relative to lug 101 in response to the rotation of cutting cone 102. When the interstice seal assembly rotates relative to lug 101, it is desirable for the interstice seal assembly to form a dynamic seal with lug 101 and a static seal with cutting cone 102.

It should also be noted that it is desirable for the interstice seal assembly to provide a seal between lug 101 and cutting cone 102 in response to cutting cone 102 moving in an axial direction 105 and radial direction 106 relative to lug 101. Cutting cone 102 can move in axial direction 105 and radial direction 106 for many different reasons. For example, cutting cone 102 can move in axial direction 105 and radial direction 106 in response to being undesirably misaligned with lug 101. Further, cutting cone 102 can move in axial direction 105 and radial direction 106 in response to engaging the formation.

It should also be noted that axial direction 105 corresponds with the axial directions of journal segment 101a and cutting cone 102 when cutting cone 102 is mounted with journal segment 101a. Further, radial direction 106 corresponds with the radial directions of journal segment 101a and cutting cone 102 when cutting cone 102 is mounted with journal segment 101a. Rotation direction 112 is parallel to axial direction 105 and perpendicular to radial direction 106.

It is desirable to seat cutting cone 102 closer to a rear portion 101b of lug 101 to reduce the amount of torque experienced by cutting cone 102 in response to engaging a formation. The torque experienced by cutting cone 102 is typically in response to a force F being applied to cutting cone 101 which causes cutting cone 102 to rotate downwardly and outwardly in a direction 144, as shown in FIG. 1b. It should be noted that force F in FIG. 1b is directed upwardly. It should also be noted that the portion of cutting cone 102 proximate to region 104b disengages journal segment 101a in response to force F. Further, the portion of cutting cone 102 proximate to region 104a engages journal segment 101a in response to force F.

The portion of cutting cone 102 proximate to region 104a that engages journal segment 101a in response to force F can cause journal segment 101a to undesirably fracture proximate to region 104a. When journal segment 101a fractures, lubricant is more likely to leak from lubricant chamber 108. Further, when journal segment 101a fractures, debris is more likely to flow from external region 109 to lubricant chamber 108. Also, when journal segment 101a fractures, cutting cone 102 will not be able to rotate about journal segment 101a as efficiently. For example, cutting cone 102 is more likely to "wobble" in response to rotating about a fractured journal segment 101a.

The seal assembly disclosed herein allows cutting cone 102 to be seated closer to rear portion 101b of lug 101 because the shortened arm portion extends axially along the journal segment and the lengthened arm portion extends radially from the journal segment. The shortened arm portion is shorter than the lengthened arm portion so that the seal assembly occupies less axial space and cutting cone 102 is positioned closer to rear portion 101b of lug 101. Cutting cone 102 experiences less torque in response to force F being applied thereto because the seal assembly occupies less axial space, and a tip 102a (FIG. 1b) of cone 103 is closer to rear portion 101b of lug 101. In this way, the seal assembly reduces the amount of torque experienced by cutting cone 102 in response to engaging the formation. Cutting cone 102 experiences less torque so that journal segment 101a is less likely to fracture.

The interstice seal assembly can have many different configurations. However, it includes an elastomeric sealing ring and rigid sealing ring positioned in an interstice of the lug and cutting cone. The elastomeric sealing ring and rigid sealing ring of the interstice seal assembly can be of many different types, as will be discussed in more detail presently.

Figure 2A:
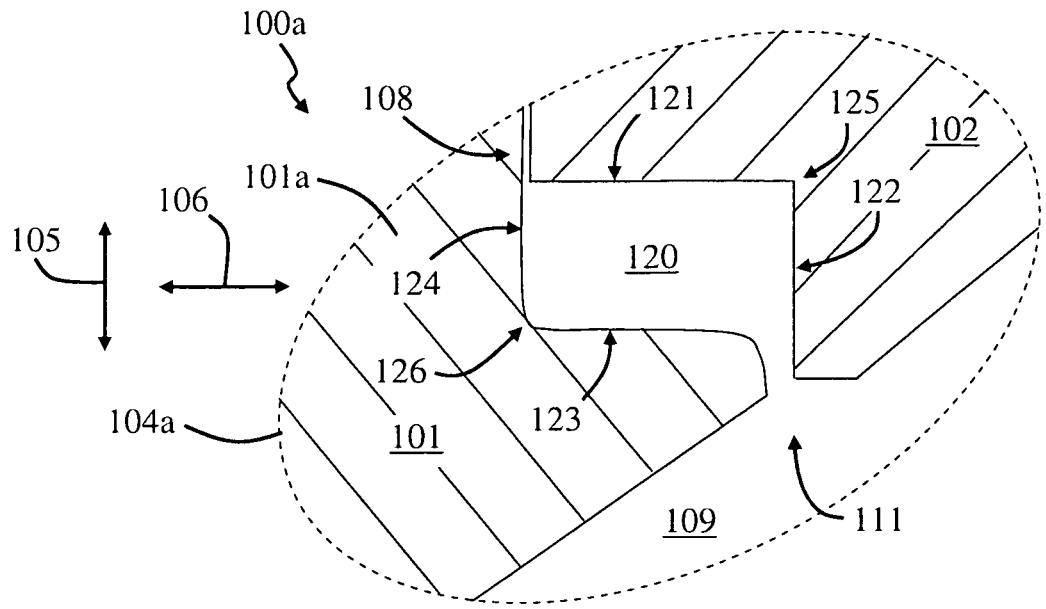
FIG. 2a is a close-up view a seal region of FIG. 1b, wherein the seal region includes an interstice.

FIG. 2a is a cut-away view of a rotary earth bit 100a, taken along cut-line I-I of FIG. 1a, showing seal region 104a of FIG. 1b. In this embodiment, rotary earth bit 100a is the same as earth bit 100 and includes an interstice 120 positioned in seal region 104a, wherein interstice 120 is positioned between opening 111 and internal region 108. It should be noted that interstice 120 is an annular interstice which extends around journal segment 101a and is between journal segment 101a and cutting cone 102. In this embodiment, interstice 120 includes radial interstice cone surface 121 and axial interstice cone surface 122 of cutting cone 102. Further, interstice 120 includes radial interstice lug surface 123 and axial interstice lug surface 124 of lug 101. It should be noted that radial interstice lug surface 123 and axial interstice lug surface 124 are typically surfaces of journal segment 101a.

As shown in FIG. 2a, interstice 120 is bounded by radial interstice cone surface 121, axial interstice cone surface 122, radial interstice lug surface 123 and axial interstice lug surface 124. Radial interstice surfaces 121 and 123 oppose each other, and axial interstice surfaces 122 and 124 oppose each other. Further, radial interstice surfaces 121 and 123 face each other, and axial interstice surfaces 122 and 124 face each other. Radial interstice cone surface 121 and axial interstice cone surface 122 intersect each other at a corner 125, and radial interstice lug surface 123 and axial interstice lug surface 124 intersect each other at a corner 126, wherein corners 125 and 126 are opposed to each other. Corner 125 is a corner of cutting cone 102 and corner 126 is a corner of lug 101. Corner 125 extends annularly around rotation axis 112 and corner 126 extends annularly around journal segment 101a.

It should be noted that surfaces 121 and 123 are radial surfaces because they extend in radial direction 106. Further, surfaces 122 and 124 are axial surfaces because they extend in axial direction 105. It should also be noted that surfaces 121 and 122 are cone surfaces because they are surfaces of cutting cone 102. Further, surfaces 123 and 124 are lug surfaces because they are surfaces of lug 101. Surfaces 121 and 122 are annular surfaces because they extend annularly about rotation axis 112 of cutting cone 102. Further, surfaces 123 and 124 are annular surfaces because they extend annularly about journal segment 101a.

Interstice 120 is formed in response to mounting cutting cone 102 with lug 101. In particular, interstice 120 is formed in response to mounting cutting cone 102 with journal segment 101a. Interstice 120 is formed in response to positioning radial interstice cone surface 121 so it is opposed to radial interstice lug surface 123. Further, interstice 120 is formed in response to positioning axial interstice cone surface 122 so it is opposed to axial interstice lug surface 124. Interstice 120 is formed in response to positioning radial interstice cone surface 121 so it faces radial interstice lug surface 123. Further, interstice 120 is formed in response to positioning axial interstice cone surface 122 so it faces axial interstice lug surface 124. In this way, interstice 120 is formed in response to mounting cutting cone 102 with lug 101.

Figure 2B:
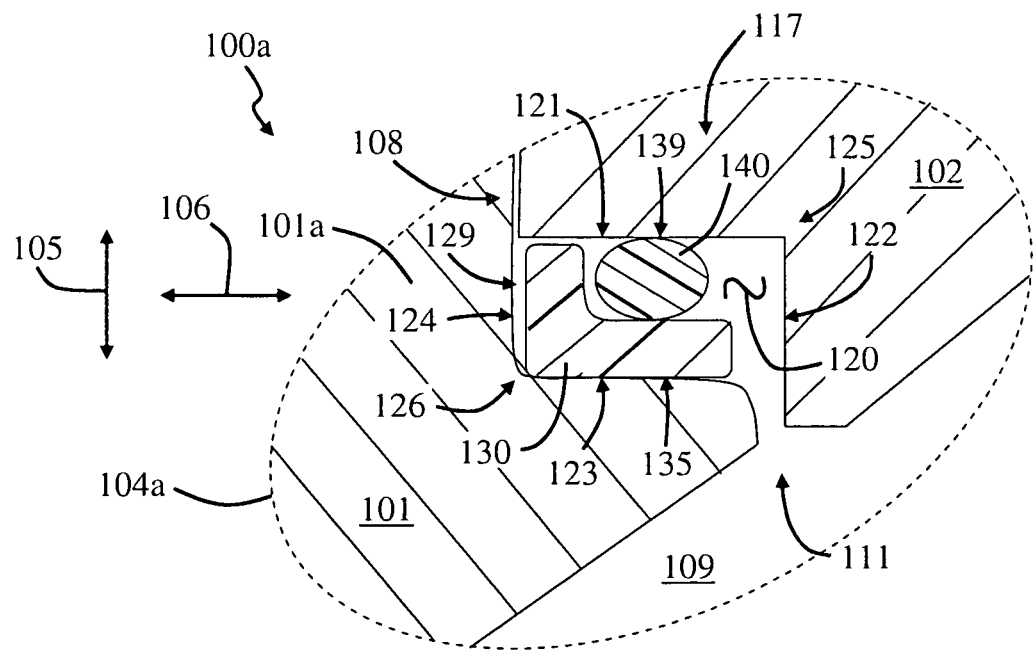
Figure 3A:
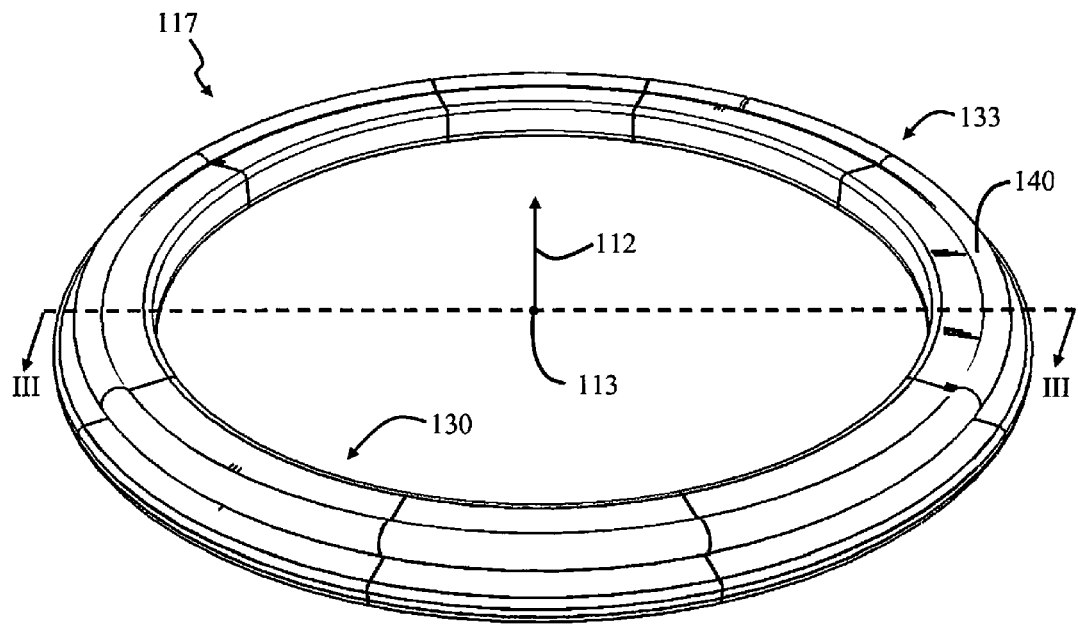
FIG. 3a is a perspective view of the interstice seal assembly of FIG. 2b.
Figure 3B:
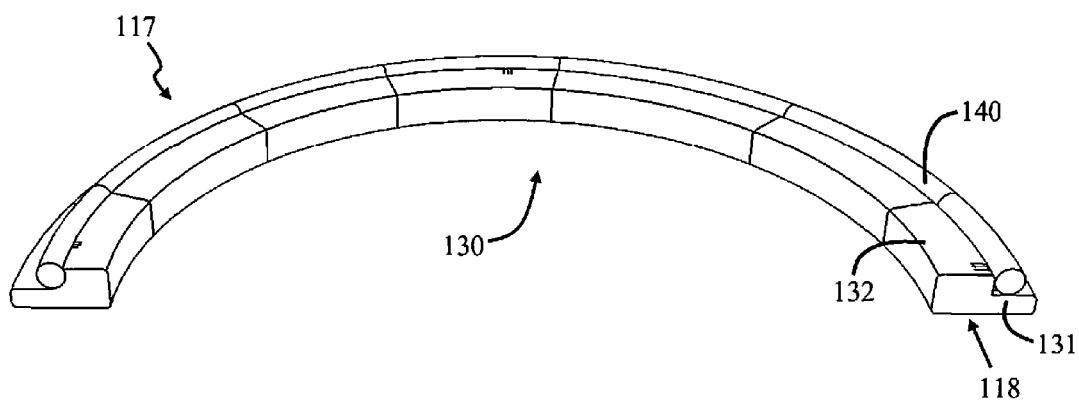

FIG. 2b is a cut-away view of rotary earth bit 100a, taken along cut-line I-I of FIG. 1a, showing an interstice seal assembly 117 positioned in interstice 120 (FIG. 2a). FIG. 3a is a perspective view of one embodiment of interstice seal assembly 117, and FIG. 3b is a cut-away perspective view of interstice seal assembly 117 of FIG. 3a taken along a cut-line III-III of FIG. 3a. The view of interstice seal assembly 117 in FIG. 2b is in a direction 118 of FIG. 3b.

Figure 4A:
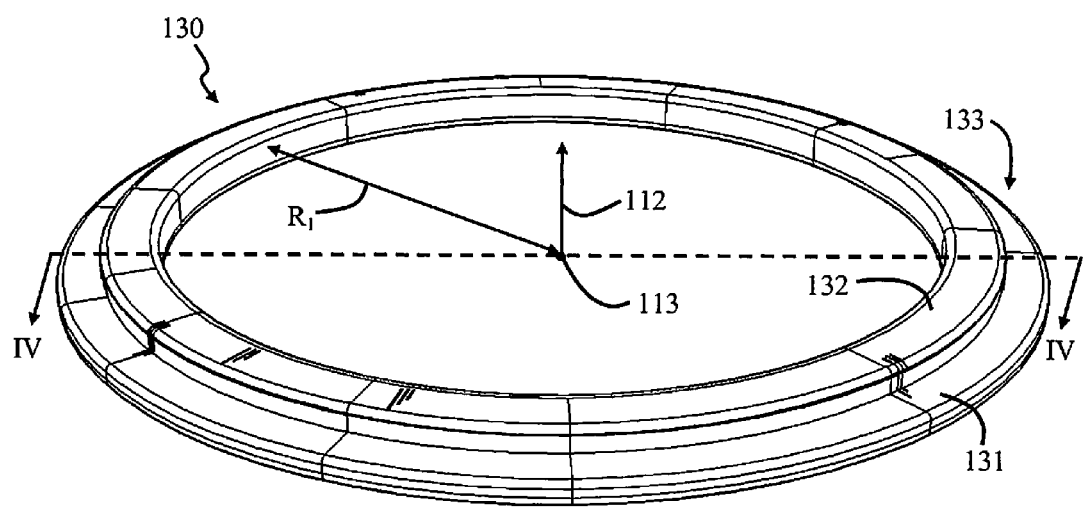
FIG. 4a is a perspective view of a rigid sealing ring included with the interstice seal assembly of FIG. 2b.
Figure 4B:
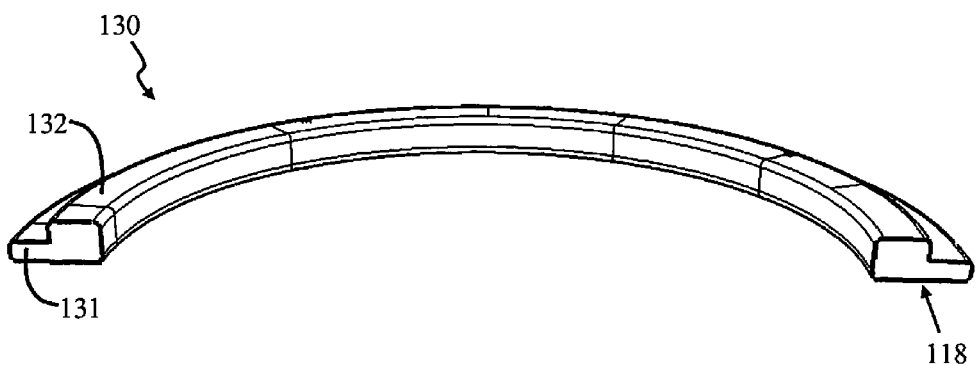

Interstice seal assembly 117 includes a rigid sealing ring 130 and elastomeric sealing ring 140. FIG. 4a is a perspective view of one embodiment of rigid sealing ring 130, and FIG. 4b is a cut-away perspective view of rigid sealing ring 130 of FIG. 4a taken along a cut-line IV-IV of FIG. 4a. The view of rigid sealing ring 130 in FIG. 2b is taken in direction 118 of FIG. 4b. As discussed in more detail below, rigid sealing ring 130 includes a lengthened arm portion 131 and shortened arm portion 132. Rigid sealing ring 130 includes a rigid material, such as metal, so that it is less likely to become impregnated with debris.

Figure 5A:
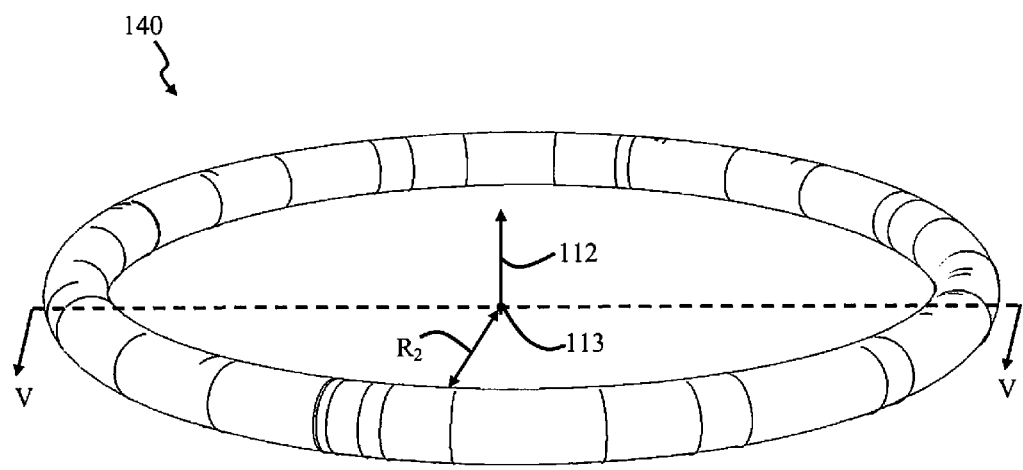
FIG. 5a is a perspective view of an elastomeric sealing ring included with the interstice seal assembly of FIG. 2b.
Figure 5B:
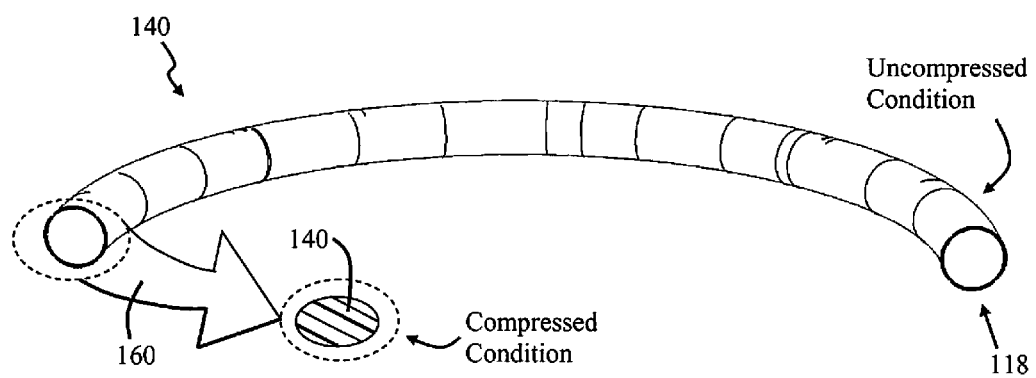

FIG. 5a is a perspective view of one embodiment of elastomeric sealing ring 140, and FIG. 5b is a cut-away perspective view of elastomeric sealing ring 140 of FIG. 5a taken along a cut-line V-V of FIG. 5a. The view of elastomeric sealing ring 140 in FIG. 2b is taken in direction 118 of FIG. 5b.

Elastomeric sealing ring 140 includes elastomeric material so it is repeatably moveable between compressed and uncompressed conditions. In this embodiment, elastomeric sealing ring 140 has a circular cross-sectional shape when it is in the uncompressed condition. However, as indicated by an indication arrow 160 in FIG. 5b, elastomeric sealing ring 140 has a non-circular cross-sectional shape when it is in a compressed condition. In particular, elastomeric sealing ring 140 has an oblong cross-sectional shape when it is in the compressed condition. It should be noted that elastomeric sealing ring 140 can have non-circular cross-sectional shapes in the uncompressed condition, if desired. For example, elastomeric sealing ring 140 can have oblong, rectangular and square cross-sectional shapes in the uncompressed condition. Examples of elastomeric sealing rings with non-circular cross-sectional shapes in the uncompressed condition are disclosed in the above-referenced U.S. Pat. No. 6,033,117.

For the embodiment in which elastomeric sealing ring 140 has a circular cross-sectional shape in the uncompressed condition, the dimensions of elastomeric sealing ring 140 in axial direction 105 and radial direction 106 are driven to be equal in the uncompressed condition. In these embodiments, in the compressed condition, the dimensions of elastomeric sealing ring 140 in axial direction 105 and radial direction 106 are driven to be unequal. In particular, the dimension of elastomeric sealing ring 140 in axial direction 105 is reduced relative to the corresponding dimension in the uncompressed condition. Further, the dimension of elastomeric sealing ring 140 in radial direction 106 is increased relative to the corresponding dimension in the uncompressed condition. It should also be noted that elastomeric sealing ring 140 is in the compressed condition in FIG. 2b. Examples of elastomeric sealing ring 140 in the uncompressed condition will be discussed in more detail below.

As discussed in more detail below, elastomeric sealing ring 140 is moved between the compressed and uncompressed conditions in response to radial interstice cone surface 121 moving relative to radial interstice lug surface 123. One way in which radial interstice cone surface 121 can move relative to radial interstice lug surface 123 is to move cutting cone 102 in axial direction 105. Elastomeric sealing ring 140 is moved between the compressed and uncompressed conditions in response to moving radial interstice cone surface 121 relative to radial interstice lug surface 123. Elastomeric sealing ring 140 is moved between the compressed and uncompressed conditions in response to being engaged by radial interstice cone surface 121 and rigid sealing ring 130. In particular, elastomeric sealing ring 140 is moved between the compressed and uncompressed conditions in response to elastomeric sealing ring 140 being engaged by radial interstice cone surface 121 and lengthened arm portion 131. It should be noted that the movement of cutting cone 102 is restricted to be less than or equal to the amount of compression experienced by elastomeric sealing ring 140.

As can be seen in FIGS. 3a, 3b, 4a, 4b, 5a and 5b, interstice seal assembly 117, rigid sealing ring 130 and elastomeric sealing ring 140 are annular in shape and each has a central opening. The central opening of rigid sealing ring 130, which has an inner radius of $R_1$ (FIG. 4a), is sized and shaped to receive journal segment 101a, as shown in FIGS. 7b and 8b below. Further, the central opening of elastomeric sealing ring 140, which has an inner radius of $R_2$ (FIG. 5a), is sized and shaped to receive shortened arm portion 132, as shown in FIGS. 3b, 7b and 8b. Radius $R_2$ is greater than radius $R_1$ because the central opening of elastomeric sealing ring 140 is sized and shaped to receive shortened arm portion 132. It should be noted that the inner radii of rigid sealing ring 130 and elastomeric sealing ring 140 can be determined in many different ways. In this embodiment, the inner radii of rigid sealing ring 130 and elastomeric sealing ring 140 are determined from a center point 113, which is shown in FIGS. 3a, 4a and 5a. It should also be noted that rotation axis 112 (FIG. 1b) generally extends through center point 113 so that cutting cone 102 and seal assembly 117 rotate about rotation axis 112.

Figure 6A:
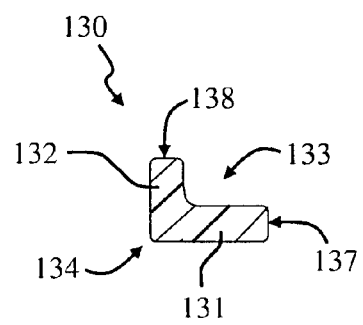
FIGS. 6a, 6b and 6c are close-up end views of the rigid sealing ring of FIG. 4b showing the lengthened and shortened arm portions in more detail.
Figure 6B:
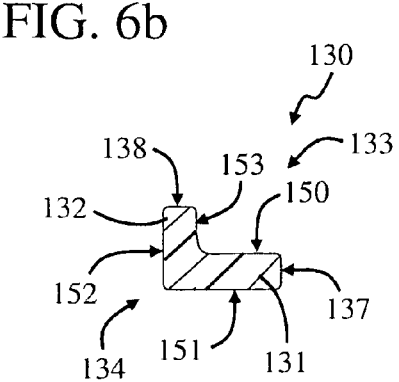
Figure 6C:
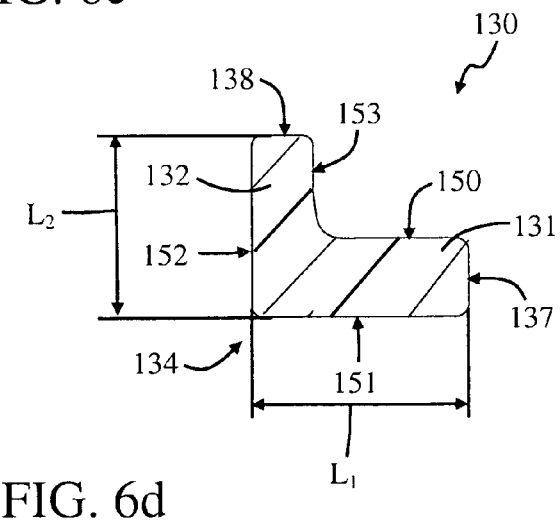

FIGS. 6a, 6b and 6c are close-up end views of rigid sealing ring 130 looking in direction 118 of FIG. 4b, showing lengthened arm portion 131 and shortened arm portion 132 in more detail. Lengthened arm portion 131 is longer than shortened arm portion 132, and lengthened arm portion 131 extends outwardly from shortened arm portion 132, so that rigid sealing ring 130 has an L-shaped cross-sectional shape.

Lengthened arm portion 131 and shortened arm portion 132 are connected together at an intersection 134. It should be noted that, in this embodiment, intersection 134 is positioned proximate to corner 126 (FIGS. 2a and 2b), and away from corner 125 (FIGS. 2a and 2b), when rigid sealing ring 130 is received by journal segment 101a. Lengthened arm portion 131 and shortened arm portion 132 are connected together at a non-zero angle relative to each other. In this embodiment, the non-zero angle is about ninety degrees so that lengthened arm portion 131 and shortened arm portion 132 are perpendicular to each other and rigid sealing ring 130 has an L-shaped cross-sectional shape. In general, the cross-sectional shape of rigid sealing ring 130 is chosen so that rigid sealing ring 130 extends along radial interstice lug surface 123 and axial interstice lug surface 124 when rigid sealing ring 130 is received by journal segment 101a. As will be discussed in more detail below, it is desirable for rigid sealing ring 130 to extend along radial interstice lug surface 123 so that a dynamic seal is formed between them. In particular, it is desirable for lengthened arm portion 131 to extend along radial interstice lug surface 123 so that a dynamic seal 135 (FIG. 2b) is formed therebetween. Dynamic seal 135 will be discussed in more detail below.

As shown in FIGS. 6b and 6c, rigid sealing ring 130 includes a lengthened arm portion dynamic surface 151 and lengthened arm portion static surface 150, which are surfaces of lengthened arm portion 131. Lengthened arm portion dynamic surface 151 is opposed to lengthened arm portion static surface 150. Further, lengthened arm portion static surface 150 faces away from lengthened arm portion dynamic surface 151.

Rigid sealing ring 130 includes a shortened arm portion dynamic surface 152 and shortened arm portion static surface 153, which are surfaces of shortened arm portion 132. Shortened arm portion dynamic surface 152 is opposed to shortened arm portion static surface 153. Further, shortened arm portion dynamic surface 152 faces away from shortened arm portion static surface 153.

Rigid sealing ring 130 includes a lengthened arm portion end surface 137, which is a surface of lengthened arm portion 131 that extends between lengthened arm portion static surface 150 and lengthened arm portion dynamic surface 151. Lengthened arm portion end surface 137 faces away from shortened arm portion dynamic surface 152. Rigid sealing ring 130 includes a shortened arm portion end surface 138, which is a surface of shortened arm portion 132 that extends between shortened arm portion dynamic surface 152 and shortened arm portion static surface 153. Shortened arm portion end surface 138 faces away from lengthened arm portion dynamic surface 151.

FIG. 6c shows that lengthened arm portion 131 is longer than shortened arm portion 132, and shortened arm portion 132 is shorter than lengthened arm portion 131. Lengthened arm portion 131 is longer than shortened arm portion 132 so that lengthened arm portion end surface 137 is further away from intersection 134 than shortened arm portion end surface 138. Further, lengthened arm portion 131 is longer than shortened arm portion 132 so that shortened arm portion end surface 138 is closer to intersection 134 than lengthened arm portion end surface 137. Shortened arm portion 132 is shorter than lengthened arm portion 131 so that shortened arm portion end surface 138 is closer to intersection 134 than lengthened arm portion end surface 137. Further, shortened arm portion 132 is shorter than lengthened arm portion 131 so that lengthened arm portion end surface 137 is further away from intersection 134 than shortened arm portion end surface 138.

Lengthened arm portion 131 is longer than shortened arm portion 132 so that lengthened arm portion end surface 137 is further away from corner 126 (FIGS. 2a and 2b) than shortened arm portion end surface 138. Further, lengthened arm portion 131 is longer than shortened arm portion 132 so that shortened arm portion end surface 138 is closer to corner 126 than lengthened arm portion end surface 137. Shortened arm portion 132 is shorter than lengthened arm portion 131 so that shortened arm portion end surface 138 is closer to corner 126 than lengthened arm portion end surface 137. Further, shortened arm portion 132 is shorter than lengthened arm portion 131 so that lengthened arm portion end surface 137 is further away from corner 126 than shortened arm portion end surface 138.

In FIG. 6c, the distance between lengthened arm portion end surface 137 and shortened arm portion dynamic surface 152 is denoted as distance $L_1$, and the distance between shortened arm portion end surface 138 and lengthened arm portion dynamic surface 151 is denoted as distance $L_2$. In this embodiment, the distance between lengthened arm portion end surface 137 and intersection 134 corresponds with distance $L_1$, and the distance between shortened arm portion end surface 138 and intersection 134 corresponds with distance $L_2$.

Lengthened arm portion 131 is longer than shortened arm portion 132 so that distance $L_1$, between lengthened arm portion end surface 137 and shortened arm portion dynamic surface 152, is greater than distance $L_2$, between shortened arm portion end surface 138 and lengthened arm portion dynamic surface 151. In this way, distance $L_1$ is greater than distance $L_2$, and lengthened arm portion 131 is longer than shortened arm portion 132. Shortened arm portion 132 is shorter than lengthened arm portion 131 so that distance $L_2$, between shortened arm portion end surface 138 and lengthened arm portion dynamic surface 151, is shorter than distance $L_1$, between lengthened arm portion end surface 137 and shortened arm portion dynamic surface 152. In this way, distance $L_2$ is less than distance $L_1$, and shortened arm portion 132 is shorter than lengthened arm portion 131.

Figure 6D:
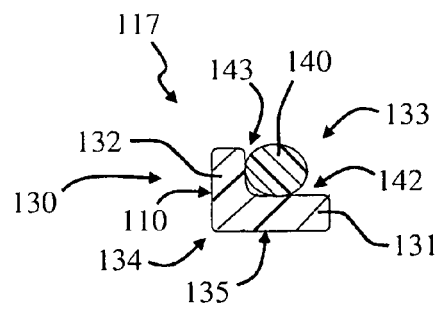
FIG. 6d is a cut-away end view of the interstice seal assembly of FIG. 3b showing the elastomeric sealing ring engaged with the lengthened and shortened arm portions.
Figure 6E:
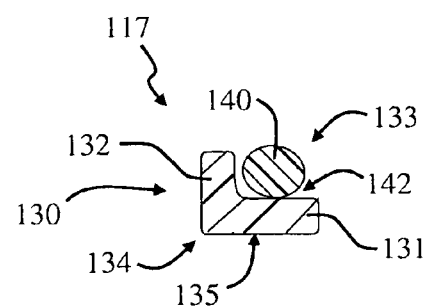
FIG. 6e is a cut-away end view of the interstice seal assembly of FIG. 3b showing the elastomeric sealing ring engaged with the lengthened arm portion and not the shortened arm portion.

Rigid sealing ring 130 includes a notch 133, as shown in FIGS. 6a, 6b, 6c, 6d and 6e. It should be noted that FIGS. 6d and 6e are cut-away end views of interstice seal assembly 117 looking in direction 118 of FIG. 3b. When rigid sealing ring 130 is received by journal segment 101a, notch 133 faces corner 125 (FIGS. 2a and 2b), which is the intersection between axial and radial interstice cone surfaces 121 and 122 of cutting cone 102. Further, notch 133 faces away from corner 126, which is the intersection between axial and radial interstice lug surfaces 123 and 124.

Notch 133 extends between lengthened arm portion 131 and shortened arm portion 132. Further, lengthened arm portion static surface 150 and shortened arm portion static surface 153 face notch 133. In this way, notch 133 is bounded by radial interstice cone surface 121, axial interstice cone surface 122, lengthened arm portion static surface 150 and shortened arm portion static surface 153 when rigid sealing ring 130 is positioned in interstice 120, as shown in FIG. 2b.

As shown in FIGS. 6d and 6e, notch 133 is sized and shaped to receive elastomeric sealing ring 140. In this way, elastomeric sealing ring 140 is bounded by radial interstice cone surface 121, axial interstice cone surface 122, lengthened arm portion static surface 150 and shortened arm portion static surface 153 when rigid sealing ring 130 and elastomeric sealing ring 140 are positioned in interstice 120, as shown in FIG. 2b.

In general, elastomeric sealing ring 140 engages lengthened arm portion 131 and/or shortened arm portion 132. In FIG. 6d, elastomeric sealing ring 140 engages both lengthened arm portion 131 and shortened arm portion 132. In the embodiment of FIG. 6d, elastomeric sealing ring 140 engages lengthened arm portion 131 so that a static seal 142 is formed between them. In particular, elastomeric sealing ring 140 engages lengthened arm portion static surface 150 so that static seal 142 is formed therebetween. In these embodiments, elastomeric sealing ring 140 also engages shortened arm portion 132 so that a static seal 143 is formed between them. In particular, elastomeric sealing ring 140 engages shortened arm portion static surface 153 so that static seal 143 is formed therebetween.

It should be noted that, in some embodiments, elastomeric sealing ring 140 engages lengthened arm portion static surface 150 and, in the uncompressed condition, elastomeric sealing ring 140 does not engage shortened arm portion static surface 153. In these embodiments, however, elastomeric sealing ring 140 can engage lengthened arm portion static surface 150 and shortened arm portion static surface 153 in response to moving from the uncompressed condition to the compressed condition. In this way, static seal 143 is formed in response to elastomeric sealing ring 140 moving from the uncompressed condition to the compressed condition.

In the embodiment of FIG. 6e, elastomeric sealing ring 140 engages lengthened arm portion 131, and does not engage shortened arm portion 132 when the centers of elastomeric sealing ring 140 and rigid sealing ring 130 are aligned. In these embodiments, elastomeric sealing ring 140 engages lengthened arm portion 131 so that static seal 142 is formed between them. In particular, elastomeric sealing ring 140 engages lengthened arm portion static surface 150 so that static seal 142 is formed therebetween.

It should be noted that in the embodiment of FIG. 6e, a portion of elastomeric sealing ring 140 can engage shortened arm portion 132, while another portion of elastomeric sealing ring 140 is not engaged with shortened arm portion 132. In particular, a portion of elastomeric sealing ring 140 can engage shortened arm portion dynamic surface 153. However, another portion of elastomeric sealing ring 140 does not engage shortened arm portion 132. In particular, another portion of elastomeric sealing ring 140 does not engage shortened arm portion dynamic surface 153. The portion of elastomeric sealing ring 140 can engage shortened arm portion 132, while another portion of elastomeric sealing ring 140 is not engaged with shortened arm portion 132, if the centers of elastomeric sealing ring 140 and rigid sealing ring 130 are not aligned with each other. In some embodiments, elastomeric sealing ring 140 does not engage shortened arm portion 132. In these embodiments, elastomeric sealing ring 140 forms a seal with lengthened arm portion 131, and elastomeric sealing ring 140 does not form a seal with shortened arm portion 132.

In some situations, static seals 142 and/or 143 are formed after rigid sealing ring 130 is received by journal segment 101a. In these situations, rigid sealing ring 130 is received by journal segment 101a and then elastomeric sealing ring 140 is received by journal segment 101a and mounted with rigid sealing ring 130 so that static seals 142 and/or 143 are formed. In other situations, static seals 142 and/or 143 are formed before rigid sealing ring 130 is received by journal segment 101a. In these situations, elastomeric sealing ring 140 is mounted with rigid sealing ring 130 so that static seals 142 and/or 143 are formed and then interstice sealing ring 117 is mounted with journal segment 101a or cutting cone 102, as described above.

It should be noted that elastomeric sealing ring 140 forms a static seal 139 with cutting cone 102, as shown in FIG. 2b. In particular, elastomeric sealing ring 140 forms static seal 139 with axial interstice cone surface 121. As mentioned above, it is desirable for elastomeric sealing ring 140 to form static seal 142 with rigid sealing ring 130, as shown in FIGS. 6d and 6e. In particular, it is desirable for elastomeric sealing ring 140 to form static seal 142 with lengthened arm portion 131 of rigid sealing ring 130. It should be noted that static seal 139 is opposed to static seal 142 (FIGS. 6d and 6e).

In some situations, static seal 139 is formed after interstice sealing ring 117 is received by journal segment 101a. In these situations, interstice sealing ring 117 is received by journal segment 101a and then cutting cone 102 is mounted with journal segment 101a. In other situations, static seal 139 is formed before interstice sealing ring 117 is received by journal segment 101a. In these situations, interstice sealing ring 117 is carried by cutting cone 102 so that static seal 139 is formed and then interstice sealing ring 117 and cutting cone 102 are mounted with journal segment 101a, as described above.

Hence, it is generally desirable for elastomeric sealing ring 140 to form static seal 142 with rigid sealing ring 130 and static seal 139 with cutting cone 102. In particular, it is desirable for elastomeric sealing ring 140 to form static seal 142 with lengthened arm portion 131 and static seal 139 with radial interstice cone surface 121. It is desirable for elastomeric sealing ring 140 to form static seals 142 and 139 so that elastomeric sealing ring 140 and rigid sealing ring 130 do not rotate relative to cutting cone 102. Further, it is desirable for elastomeric sealing ring 140 to form static seal 142 with rigid sealing ring 130 and static seal 139 with cutting cone 102 so that elastomeric sealing ring 140 and rigid sealing ring 130 rotate relative to lug 101 in response to rotation of cutting cone 102. Rigid sealing ring 130 rotates relative to lug 101 so that dynamic seal 135 is formed therebetween. In this way, interstice seal assembly 117 forms static and dynamic seals with cutting cone 102 and lug 101, respectively. It should be noted that dynamic seal 135 is a radial dynamic seal because it extends in radial direction 106.

Rigid sealing ring 130 is positioned in interstice 120 so that lengthened arm portion 131 engages radial interstice lug surface 123, as shown in FIG. 2b. Further, lengthened arm portion 131 of rigid sealing ring 130 engages radial interstice lug surface 123 so that dynamic seal 135 is formed therebetween. In particular, rigid sealing ring 130 is positioned so that lengthened arm portion dynamic surface 151 engages radial interstice lug surface 123. Lengthened arm portion dynamic surface 151 engages radial interstice lug surface 123 so that dynamic seal 135 is formed between lengthened arm portion dynamic surface 151 and radial interstice lug surface 123. It should be noted that lengthened arm portion dynamic surface 151 faces radial interstice lug surface 123.

Hence, dynamic seal 135 is formed in response to mounting interstice seal assembly 117 with lug 101. In particular, dynamic seal 135 is formed in response to mounting rigid sealing ring 130 with journal segment 101a so lengthened arm portion 131 engages radial interstice lug surface 123. Further, dynamic seal 135 is formed in response to mounting rigid sealing ring 130 with journal segment 101a so that lengthened arm portion dynamic surface 151 engages radial interstice lug surface 123. It should be noted that, in some embodiments, dynamic seal 135 is formed before cutting cone 102 is mounted with journal segment 101a. In other embodiments, interstice seal assembly 117 is carried by cutting cone 102 and then they are mounted with journal segment 101a so that dynamic seal 135 is formed in response. In this way, dynamic seal 135 is formed in response to mounting cutting cone 102 with lug 101.

Rigid sealing ring 130 is positioned so that lengthened arm portion 131 of rigid sealing ring 130 extends along radial interstice lug surface 123, as shown in FIG. 2b. Further, lengthened arm portion 131 of rigid sealing ring 130 extends along radial interstice lug surface 123 so that dynamic seal 135 is formed therebetween. In particular, rigid sealing ring 130 is positioned so that lengthened arm portion dynamic surface 151 extends along radial interstice lug surface 123. Lengthened arm portion dynamic surface 151 extends along radial interstice lug surface 123 so that dynamic seal 135 is formed between lengthened arm portion dynamic surface 151 and radial interstice lug surface 123.

As mentioned above, dynamic seal 135 is formed in response to mounting interstice seal assembly 117 with lug 101. In particular, dynamic seal 135 is formed in response to mounting rigid sealing ring 130 with journal segment 101a of lug 101 so lengthened arm portion 131 extends along radial interstice lug surface 123. Further, dynamic seal 135 is formed in response to mounting rigid sealing ring 130 with journal segment 101a of lug 101 so that lengthened arm portion dynamic surface 151 extends along radial interstice lug surface 123.

Rigid sealing ring 130 is positioned in interstice 120 so that lengthened arm portion 131 extends away from axial interstice lug surface 124, as shown in FIG. 2b. In particular, rigid sealing ring 130 is positioned in interstice 120 so that lengthened arm portion static surface 150 and lengthened arm portion dynamic surface 151 extend away from axial interstice lug surface 124. Lengthened arm portion 131 extends away from axial interstice lug surface 124 because, as mentioned above, lengthened arm portion 131 extends outwardly from shortened arm portion 132.

Rigid sealing ring 130 is positioned in interstice 120 so that lengthened arm portion 131 extends towards opening 111. In particular, rigid sealing ring 130 is positioned in interstice 120 so that lengthened arm portion static surface 150 and lengthened arm portion static surface 151 extend towards opening 111, as shown in FIG. 2b.

Rigid sealing ring 130 is positioned in interstice 120 so that lengthened arm portion end surface 137 is positioned proximate to opening 111 and away from axial interstice lug surface 124. Rigid sealing ring 130 is positioned in interstice 120 so that lengthened arm portion end surface 137 faces axial interstice cone surface 122. In this way, material flowing through opening 111 flows between lengthened arm portion end surface 137 and axial interstice cone surface 122.

Rigid sealing ring 130 is positioned in interstice 120 so that shortened arm portion 132 extends along axial interstice lug surface 124, as shown in FIG. 2b. In particular, rigid sealing ring 130 is positioned so that shortened arm portion dynamic surface 152 extends along axial interstice lug surface 124. Rigid sealing ring 130 is positioned in interstice 120 so that shortened arm portion dynamic surface 152 faces axial interstice lug surface 124.

In some embodiments, rigid sealing ring 130 is positioned in interstice 120 so that shortened arm portion 131 engages axial interstice lug surface 124 so that a dynamic seal 110 (FIG. 6d) is formed therebetween. In particular, rigid sealing ring 130 is positioned so that shortened arm portion dynamic surface 152 engages axial interstice lug surface 124. Shortened arm portion dynamic surface 152 engages axial interstice lug surface 124 so that dynamic seal 110 is formed between shortened arm portion dynamic surface 152 and axial interstice lug surface 124. It should be noted that dynamic seal 110 is an axial dynamic seal because it extends in axial direction 105.

In other embodiments, shortened arm portion 132 is spaced from axial interstice lug surface 124 so that a space 129 is formed between them, as shown in FIG. 2b. Space 129 extends between shortened arm portion 132 and axial interstice lug surface 124. In particular, space 129 extends between shortened arm portion dynamic surface 152 and axial interstice lug surface 124. In this way, a dynamic seal is not formed between shortened arm portion 132 and axial interstice lug surface 124.

Rigid sealing ring 130 is positioned in interstice 120 so that shortened arm portion 132 extends away from radial interstice lug surface 123, as shown in FIG. 2b. In particular, rigid sealing ring 130 is positioned in interstice 120 so that shortened arm portion dynamic surface 152 and shortened arm portion static surface 153 extend away from radial interstice lug surface 123.

Rigid sealing ring 130 is positioned in interstice 120 so that shortened arm portion 132 extends towards internal region 108, as shown in FIG. 2b. In particular, rigid sealing ring 130 is positioned in interstice 120 so that shortened arm portion dynamic surface 152 and shortened arm portion static surface 153 extend towards internal region 108.

Rigid sealing ring 130 is positioned in interstice 120 so that shortened arm portion end surface 138 is positioned proximate to internal region 108 and away from radial interstice lug surface 123. Rigid sealing ring 130 is positioned in interstice 120 so that shortened arm portion end surface 138 faces internal region 108. Rigid sealing ring 130 is also positioned in interstice 120 so that shortened arm portion end surface 138 faces radial interstice cone surface 121. In this way, material flowing between internal region 108 and elastomeric sealing ring 140 flows between shortened arm portion end surface 138 and radial interstice cone surface 121.

As mentioned above, elastomeric sealing ring 140 energizes rigid sealing ring 130 against lug 101, as shown in FIG. 2b. In particular, elastomeric sealing ring 140 is positioned to energize rigid sealing ring 130 against radial interstice lug surface 123. Further, elastomeric sealing ring 140 is positioned to energize lengthened arm portion 131 against radial interstice lug surface 123. Elastomeric sealing ring 140 is positioned to energize lengthened arm portion dynamic surface 151 against radial interstice lug surface 123. As discussed in more detail below, the strength of the dynamic seal between interstice sealing ring 117 and lug 101 depends on the strength with which elastomeric sealing ring 140 energizes rigid sealing ring 130 against lug 101.

Elastomeric sealing ring 140 can energize rigid sealing ring 130 against lug 101 in many different ways. In this embodiment, lengthened arm portion 131 of rigid sealing ring 130 is positioned between elastomeric sealing ring 140 and radial interstice lug surface 123. Further, elastomeric sealing ring 140 is positioned between lengthened arm portion 131 and radial interstice cone surface 121. Elastomeric sealing ring 140 is engaged by lengthened arm portion 131 and radial interstice cone surface 121. In some situations, elastomeric sealing ring 140 is engaged by lengthened arm portion 131 and radial interstice cone surface 121 in response to mounting cutting cone 102 with journal segment 101a. In these situations, elastomeric sealing ring 140 moves from the uncompressed condition to the compressed condition in response to mounting cutting cone 102 with journal segment 101a. Elastomeric sealing ring 140 is shown in the compressed and uncompressed conditions in FIG. 5b. Elastomeric sealing ring 140 pushes lengthened arm portion 131 against radial interstice lug surface 123 in response to moving from the uncompressed condition to the compressed condition. In particular, elastomeric sealing ring 140 pushes lengthened arm portion dynamic surface 151 against radial interstice lug surface 123 in response to moving from the uncompressed condition to the compressed condition so that dynamic seal 135 is formed. In this way, elastomeric sealing ring 140 energizes rigid sealing ring 130 against lug 101.

The force with which lengthened arm portion 131 engages radial interstice lug surface 123 increases the more elastomeric sealing ring 140 energizes lengthened arm portion 131 against radial interstice lug surface 123. Further, the force with which lengthened arm portion 131 engages radial interstice lug surface 123 decreases the less elastomeric sealing ring 140 energizes lengthened arm portion 131 against radial interstice lug surface 123.

The force with which lengthened arm portion 131 engages radial interstice lug surface 123 can be adjusted in many different ways. For example, the stiffness of the material included with elastomeric sealing ring 140 can be adjusted to adjust the force with which lengthened arm portion 131 engages radial interstice lug surface 123. In general, as the stiffness of the material included with elastomeric sealing ring 140 increases and decreases, the force with which lengthened arm portion 131 engages radial interstice lug surface 123 increases and decreases, respectively.

The cross-sectional radius of elastomeric sealing ring 140 can be adjusted to adjust the force with which lengthened arm portion 131 engages radial interstice lug surface 123. In general, as the cross-sectional radius of elastomeric sealing ring 140 increases and decreases, the force with which lengthened arm portion 131 engages radial interstice lug surface 123 increases and decreases, respectively.

Length $L_2$ of shortened arm portion 132 can be adjusted to adjust the force with which lengthened arm portion 131 engages radial interstice lug surface 123. In general, as length $L_2$ of shortened arm portion 132 increases and decreases, the force with which lengthened arm portion 131 engages radial interstice lug surface 123 decreases and increases, respectively. Elastomeric sealing ring 140 can be compressed more in response to decreasing length $L_2$ of shortened arm portion 132. Further, elastomeric sealing ring 140 can be compressed less in response to length $L_2$ of shortened arm portion 132 increasing.

Lengthened arm portion end surface 137 can be adjusted to adjust the pressure with which lengthened arm portion 131 engages radial interstice lug surface 123. In general, as the axial dimension of lengthened arm portion end surface 137 increases and decreases, the pressure with which lengthened arm portion 131 engages radial interstice lug surface 123 increases and decreases, respectively. Elastomeric sealing ring 140 can be compressed more in response to the axial dimension of lengthened arm portion end surface 137 increasing. Further, elastomeric sealing ring 140 can be compressed less in response to the axial dimension of lengthened arm portion end surface 137 decreasing. The axial dimension of lengthened arm portion end surface 137 can be increased and decreased in many different ways. The axial dimension of lengthened arm portion end surface 137 can be increased and decreased by forming rigid sealing ring 130 so that the distance between lengthened arm portion static surface 150 and lengthened arm portion dynamic surface 151 is increased and decreased, respectively.

As mentioned above, interstice 120 is formed in response to mounting cutting cone 102 to lug 101. In particular, interstice 120 is formed in response to mounting cutting cone 102 to journal segment 101a. In some situations, cutting cone 102 is mounted to journal segment 101a after interstice seal assembly 117 is received by journal segment 101a. Hence, interstice 120 is formed in response to positioning elastomeric sealing ring 140 between lengthened arm portion 131 and radial interstice cone surface 121. Further, interstice 120 is formed in response to engaging elastomeric sealing ring 140 with lengthened arm portion 131 and radial interstice cone surface 121. Interstice 120 is formed in response to moving elastomeric sealing ring 140 between the uncompressed and compressed conditions. In particular, elastomeric sealing ring 140 moves from the uncompressed condition to the compressed condition in response to forming interstice 120.

As mentioned above, it is desirable for elastomeric sealing ring 140 to form static seals 142 and 139 with lengthened arm portion 131 and radial interstice cone surface 121, respectively. Static seals 142 and 139 are formed in response to positioning elastomeric sealing ring 140 between lengthened arm portion 131 and radial interstice cone surface 121. Further, static seals 142 and 139 are formed in response to engaging elastomeric sealing ring 140 with lengthened arm portion 131 and radial interstice cone surface 121, respectively. Static seals 142 and 139 are formed in response to moving elastomeric sealing ring 140 between the uncompressed and compressed conditions. In particular, elastomeric sealing ring 140 moves from the uncompressed condition to the compressed condition in response to forming static seals 142 and 139.

As mentioned above, the lubricant chamber (i.e. internal region 108) is formed in response to mounting cutting cone 102 to journal segment 101a. Hence, the lubricant chamber is formed in response to positioning elastomeric sealing ring 140 between lengthened arm portion 131 and radial interstice cone surface 121. Further, the lubricant chamber is formed in response to engaging elastomeric sealing ring 140 with lengthened arm portion 131 and radial interstice cone surface 121. The lubricant chamber is also formed in response to moving elastomeric sealing ring 140 from the uncompressed condition to the compressed condition. In particular, elastomeric sealing ring 140 moves from the uncompressed condition to the compressed condition in response to forming the lubricant chamber.

It should be noted that rotary earth bit 100 generally includes one or more seals. In embodiments in which rotary earth bit 100 includes one seal (i.e. a single seal), the one seal is positioned within an interstice between the lug and cutting cone. In embodiments in which the rotary earth bit includes two seals (i.e. a dual seal), one seal is positioned within an interstice between the lug and cutting cone. The other seal can be positioned within a groove extending through the lug or a groove extending through the cutting cone. An embodiment of a single seal rotary earth bit will be discussed in more detail with FIGS. 6a, 6b, 6c and 6d, and an embodiment of a dual seal rotary earth bit will be discussed in more detail with FIGS. 7a, 7b, 7c and 7d.

Figure 7A:
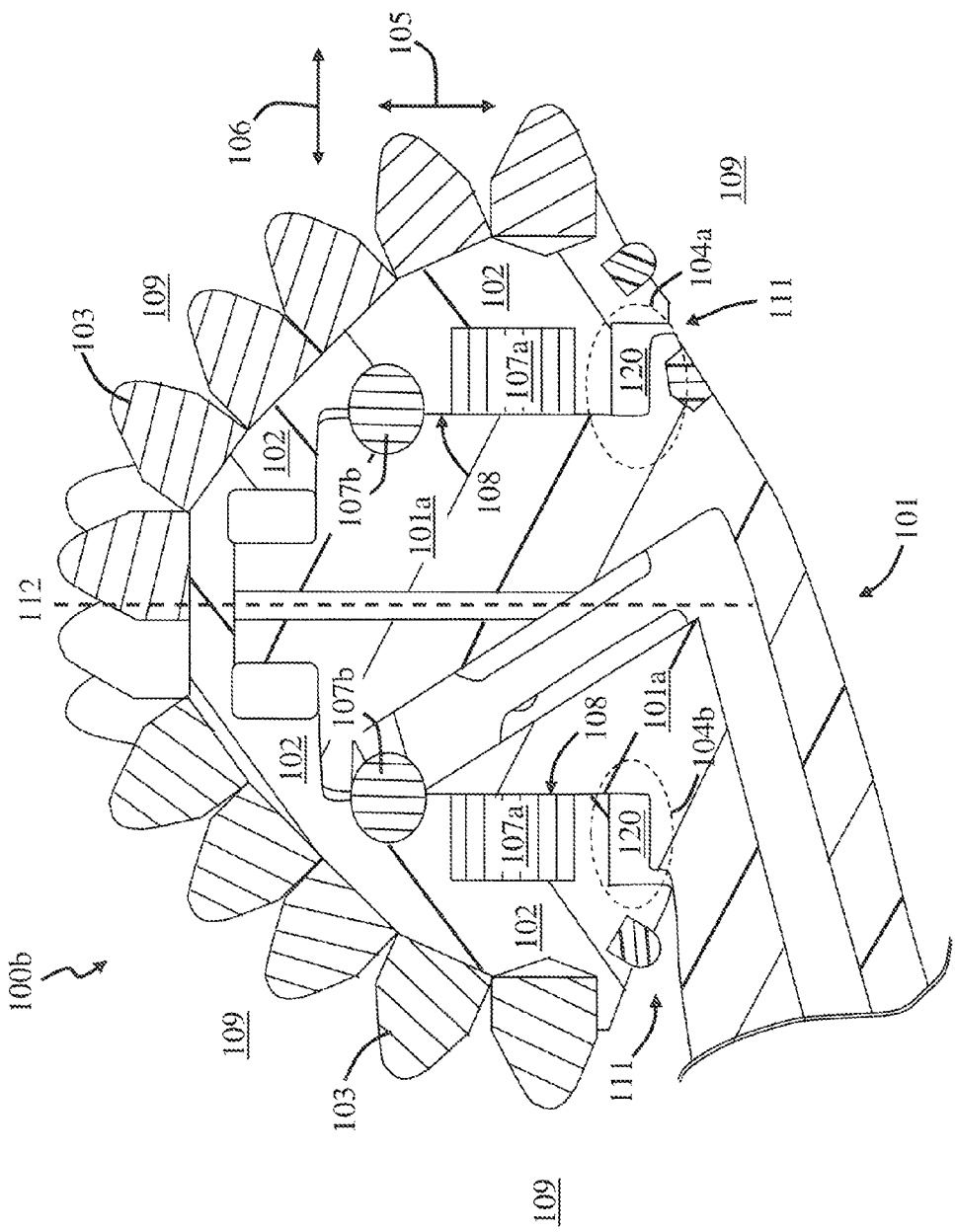
FIG. 7a is a cut-away view of a single seal rotary earth bit taken along cut-line I-I of FIG. 1a, wherein the single seal rotary earth bit includes the interstice of FIGS. 2a and 2b.
Figure 7B:
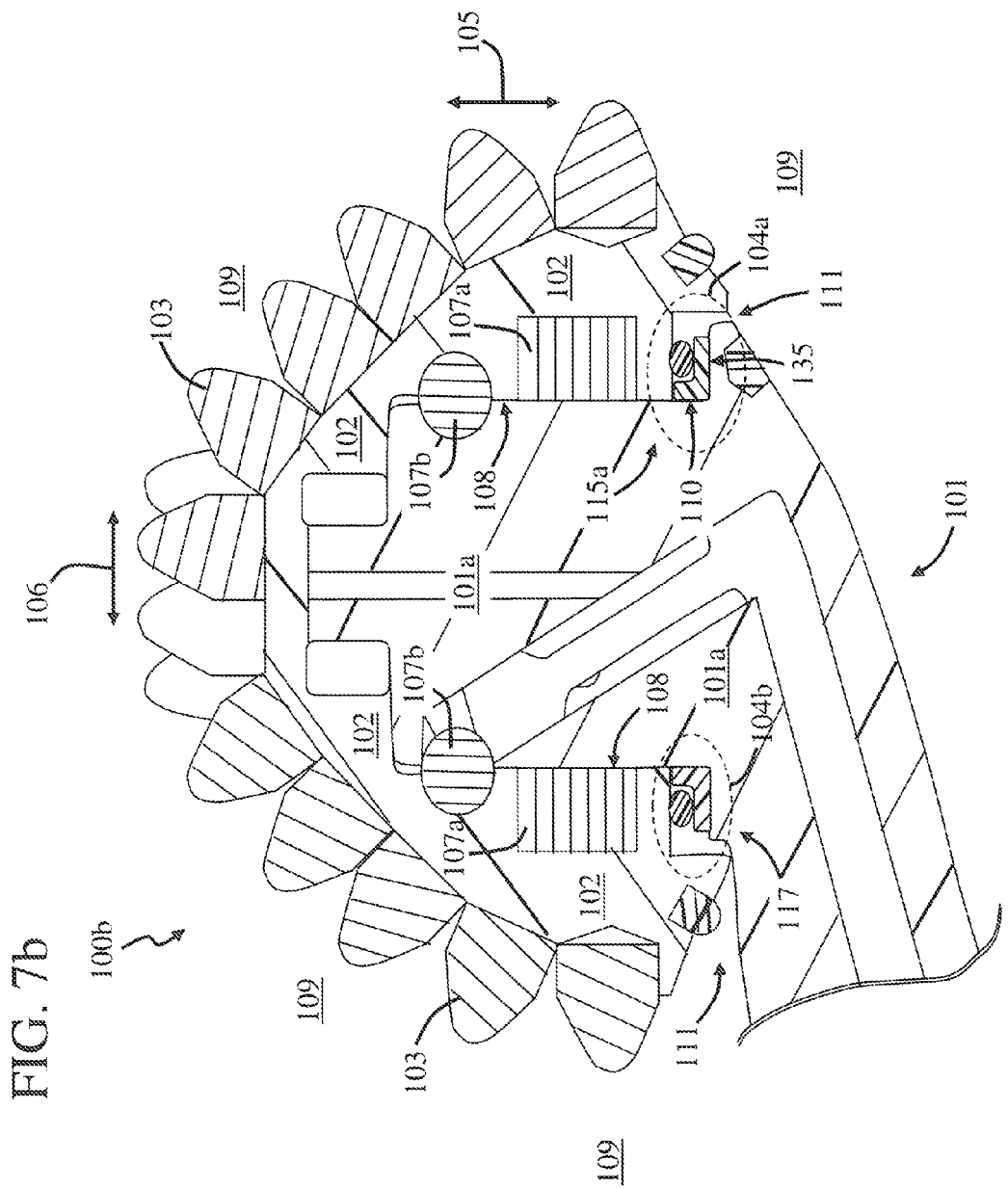
FIG. 7b is a cut-away view of the single seal rotary earth bit of FIG. 7a, wherein the single seal rotary earth bit includes the interstice seal assembly positioned in the interstice, as shown in FIG. 2b.

FIGS. 7a and 7b are cut-away views of a single seal rotary earth bit 100b taken along cut-line I-I of FIG. 1a. It should be noted that single seal rotary earth bit 100b is similar to rotary earth bits 100 and 100a, and includes interstice 120 in seal regions 104a and 104b. More information regarding interstice 120 is discussed above with FIG. 2a. Single seal rotary earth bit 100b includes interstice seal assembly 117 positioned in interstice 120, as shown in FIG. 7b. It should be noted that elastomeric sealing ring 140 is in the compressed condition in FIG. 7b. More information regarding the positioning of interstice seal assembly 117 with interstice 120 is discussed in more detail above with FIG. 2b.

FIG. 7c is a close-up view of single seal rotary earth bit 100b, with interstice seal assembly 117 extending through interstice 120, as indicated by an indication arrow 161. In this embodiment, rigid sealing ring 130 is positioned so that shortened arm portion end surface 138 is facing an interface 128 and lengthened arm portion end surface 137 is facing opening 111. Interface 128 is an interface between axial interstice lug surface 124, interior 108 and radial interstice cone surface 121. Shortened arm portion end surface 138 faces interface 128 to restrict the flow of lubricant from internal region 108 to elastomeric sealing ring 140. Intersection 134 (FIGS. 6a-6e) of rigid sealing ring 130 faces corner 126 (FIGS. 2a and 2b) so that the amount of material that can flow between internal region 108 and external region 109 is more restricted. The amount of material is more restricted because it is more difficult for the material to flow around corner 126. In this way, interstice seal assembly 117 provides earth bit 100b with a better seal.

The strength of dynamic seal 135 depends on many different factors. As the strength of dynamic seal 135 increases, less material is likely to flow between internal region 108 and external region 109. Further, as the strength of dynamic seal 135 decreases, more material is likely to flow between internal region 108 and external region 109. In general, the strength of dynamic seal 135 increases in response to increasing the dimension of lengthened arm portion 131. In particular, the strength of dynamic seal 135 increases in response to increasing the area of lengthened arm portion dynamic surface 151. Further, the strength of dynamic seal 135 increases in response to increasing distance $L_1$ (FIG. 6c).

The strength of dynamic seal 110 (FIG. 7b) depends on many different factors. As the strength of dynamic seal 110 increases, less material is likely to flow between internal region 108 and external region 109. Further, as the strength of dynamic seal 110 decreases, more material is likely to flow between internal region 108 and external region 109. In general, the strength of dynamic seal 110 increases in response to increasing the dimension of shortened arm portion 132. In particular, the strength of dynamic seal 110 increases in response to increasing the area of shortened arm portion dynamic surface 152. Further, the strength of dynamic seal 135 increases in response to increasing distance $L_2$ (FIG. 6c). It should be noted that, in the embodiment indicated by indication arrow 161 in FIG. 7c, space 129 extends between shortened arm portion 132 and axial interstice lug surface 124 so that shortened arm portion dynamic surface 152 does not engage axial interstice lug surface 124, and dynamic seal 110 is not formed. However, in the embodiment of FIG. 7b, shortened arm portion 132 and axial interstice lug surface 124 engage each other so that space 129 is not formed. In this way, the strength of the dynamic seal between rigid sealing ring 130 and lug 101 is adjustable in response to adjusting a dimension of rigid sealing ring 130.

Figure 7D:
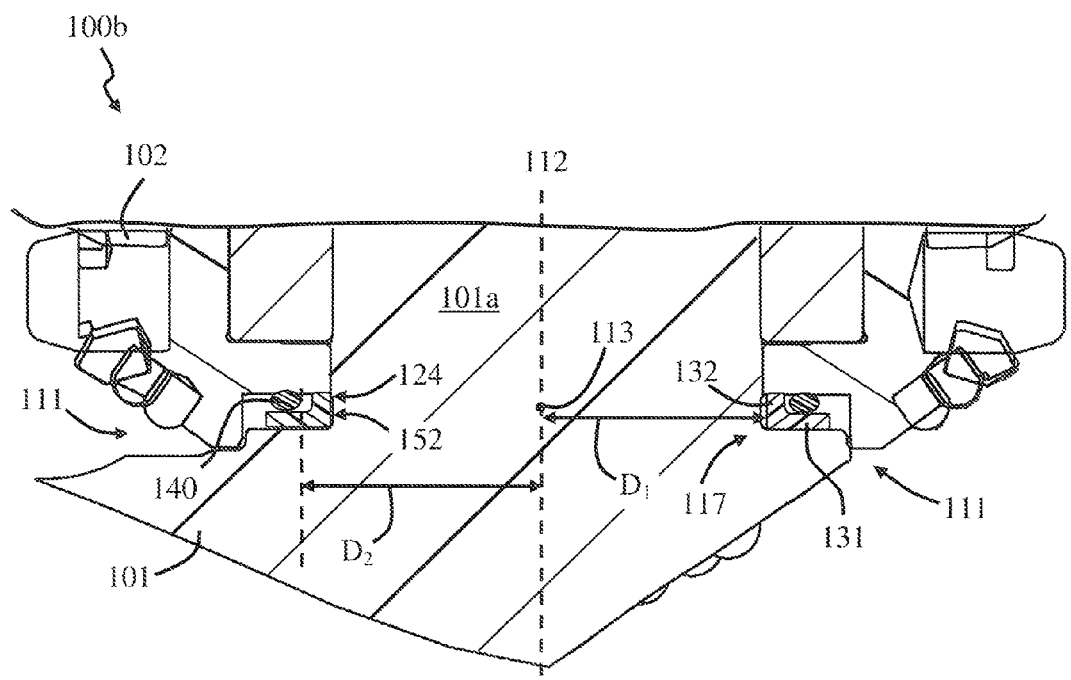
FIG. 7d is a cut-away view of the single seal rotary earth bit of FIGS. 7a and 7b showing the positioning of the rigid sealing ring and elastomeric sealing ring relative to an axis of rotation of the cutting cone.

FIG. 7d is a cut-away view of single seal rotary earth bit 100b showing the positioning of rigid sealing ring 130 and elastomeric sealing ring 140 relative to rotation axis 112 when seal assembly 117 is positioned in interstice 120. In this embodiment, rigid sealing ring 130 is positioned a distance $D_1$ from rotation axis 112. Distance $D_1$ can be determined in many different ways. In this embodiment, distance $D_1$ extends between center 113 and shortened arm portion dynamic surface 152, and corresponds with inner radius $R_1$ of rigid sealing ring 130, as shown in FIG. 4a.

In this embodiment, elastomeric sealing ring 140 is positioned a distance $D_2$ from rotation axis 112. Distance $D_2$ can be determined in many different ways. In this embodiment, distance $D_2$ corresponds with inner radius $R_2$ of elastomeric sealing ring 140, as shown in FIG. 5a. It should be noted that distance $D_2$ is adjustable in response to adjusting the compression of elastomeric sealing ring 140. Distance $D_2$ decreases in response to increasing the compression of elastomeric sealing ring 140. Further, distance $D_2$ increases in response to decreasing the compression of elastomeric sealing ring 140.

Distance $D_1$ is less than distance $D_2$ because, as discussed in more detail above, distance $R_1$ is less than distance $R_2$. Hence, elastomeric sealing ring 140 is positioned further away from rotation axis 112 than shortened arm portion 132. In particular, elastomeric sealing ring 140 is positioned further away from rotation axis 112 than shortened arm portion dynamic surface 152, shortened arm portion dynamic surface 153 and shortened arm portion end surface 138, which are shown in FIG. 7c. Further, elastomeric sealing ring 140 is positioned further away from rotation axis 112 than axial interstice lug surface 124 (FIG. 7c).

Figure 8A:
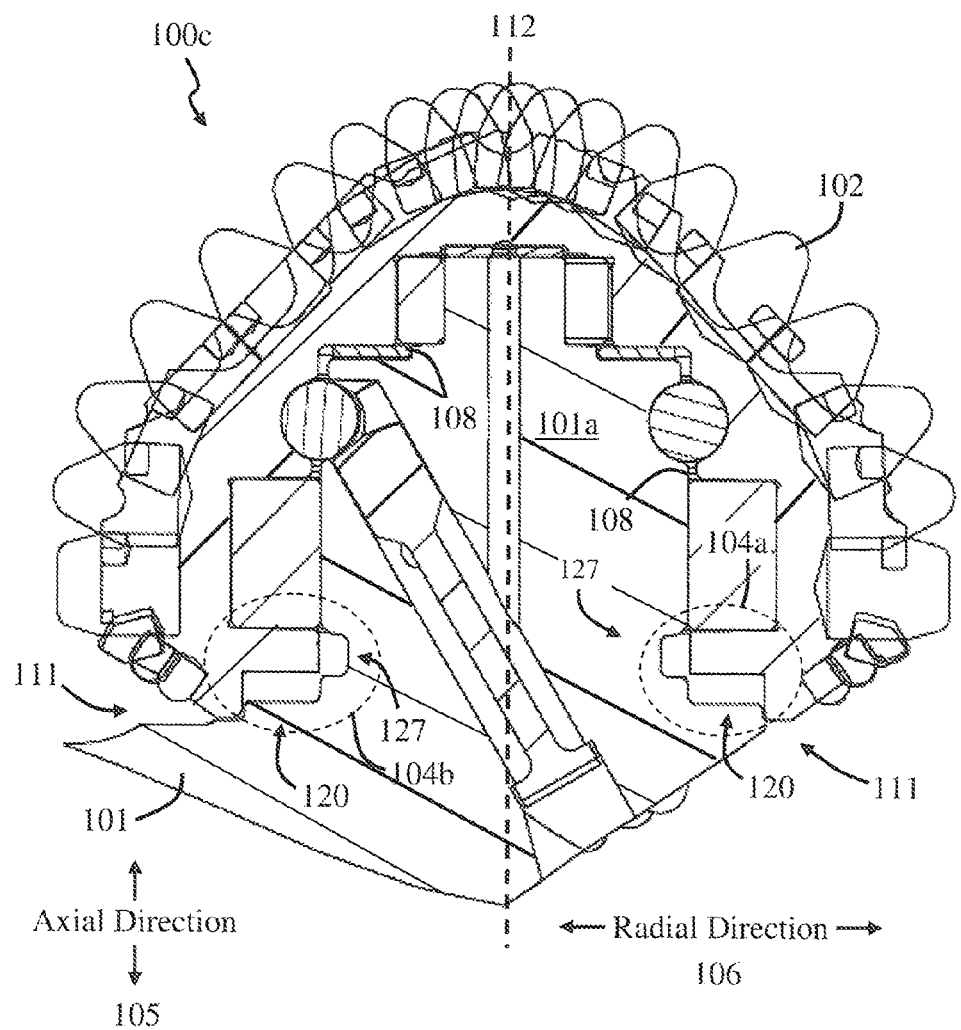
FIG. 8a is a cut-away view of a dual seal rotary earth bit taken along cut-line 2a-2a of FIG. 1a, wherein the dual seal rotary earth bit includes the interstice of FIG. 2a, and a lug groove.
Figure 8B:
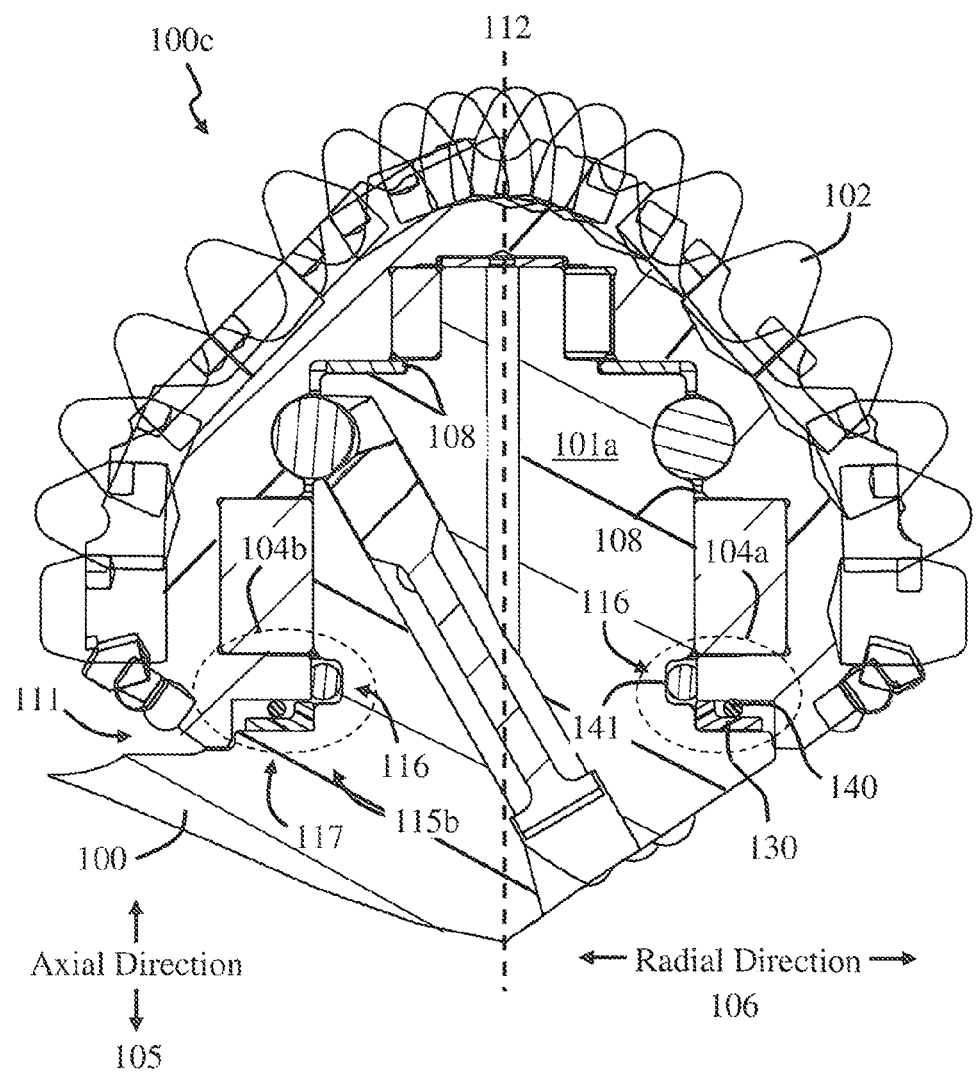
FIG. 8b is a cut-away view of the dual seal rotary earth bit of FIG. 8a, wherein the dual seal rotary earth bit includes the interstice seal assembly of FIG. 2b positioned within the interstice of FIG. 2a, and a groove seal assembly positioned in the lug groove.

FIGS. 8a and 8b are cut-away views of a dual seal rotary earth bit 100c taken along cut-line I-I of FIG. 1a. It should be noted that dual seal rotary earth bit 100c is similar to rotary earth bits 100, 100a and 100c, and includes interstice 120 in seal regions 104a and 104b (FIGS. 1a and 1b). Dual seal rotary earth bit 100c includes interstice seal assembly 117 positioned in interstice 120, as shown in FIG. 8b. It should be noted that elastomeric sealing ring 140 is in the compressed condition in FIG. 8b. More information regarding the positioning of interstice seal assembly 117 with interstice 120 is discussed above with FIG. 2b.

It should also be noted that the discussion regarding interstice seal assembly 117 of single seal rotary earth bit 100b applies to dual seal rotary earth bit 100c. For example, dual seal rotary earth bit 100c can include dynamic seals 135 and/or 110, and the strengths of dynamic seals 135 and 110 can be adjusted as discussed above with FIGS. 7a-7d. Hence, the strength of the dynamic seal between rigid sealing ring 130 and lug 101 of earth bit 100c is adjustable in response to adjusting a dimension of rigid sealing ring 130, as described above.

Dual seal rotary earth bit 100c also includes a lug groove 127 for receiving a groove seal assembly 116. Lug groove 127 is a lug groove because it extends through lug 101. In particular, lug groove 127 extends through journal segment 101a. Groove seal assembly 116 restricts the flow of lubricant between internal region 108 and interstice seal assembly 117. It should be noted that groove seal assembly 116 and interstice seal assembly 117 are often referred to as a primary seal and secondary seal, respectively. It should also be noted that, in some embodiments, the groove of dual seal rotary earth bit 100c extends through cutting cone 102 so that it is a cone groove. In other embodiments, dual seal rotary earth bit 100c includes both a lug and cone groove for receiving a lug seal assembly and cone seal assembly, respectively.

Figure 8C:
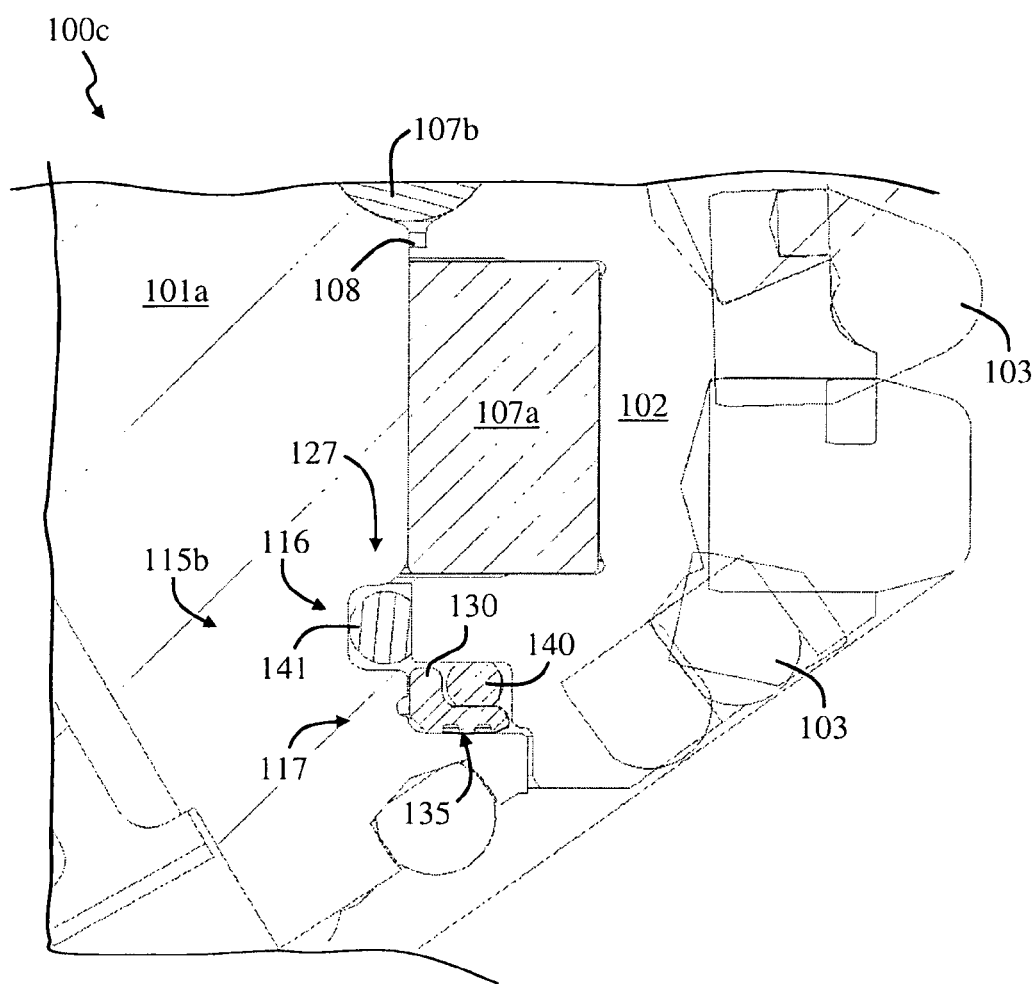
FIG. 8c is a close-up view of the dual seal rotary earth bit of FIGS. 8a and 8b showing the interstice seal assembly and groove seal assembly in more detail.
Figure 8D:
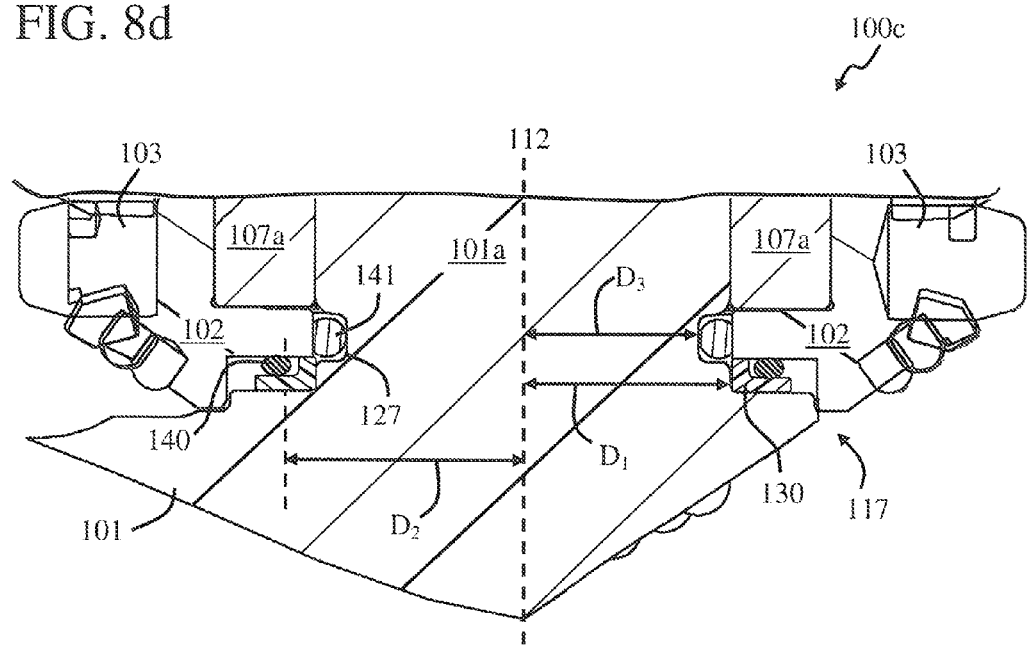
FIG. 8d is a cut-away view of the dual seal rotary earth bit of FIGS. 8a and 8b showing the positioning of the rigid sealing ring, elastomeric sealing ring and groove seal assembly relative to an axis of rotation of the cutting cone.
Figure 9A:
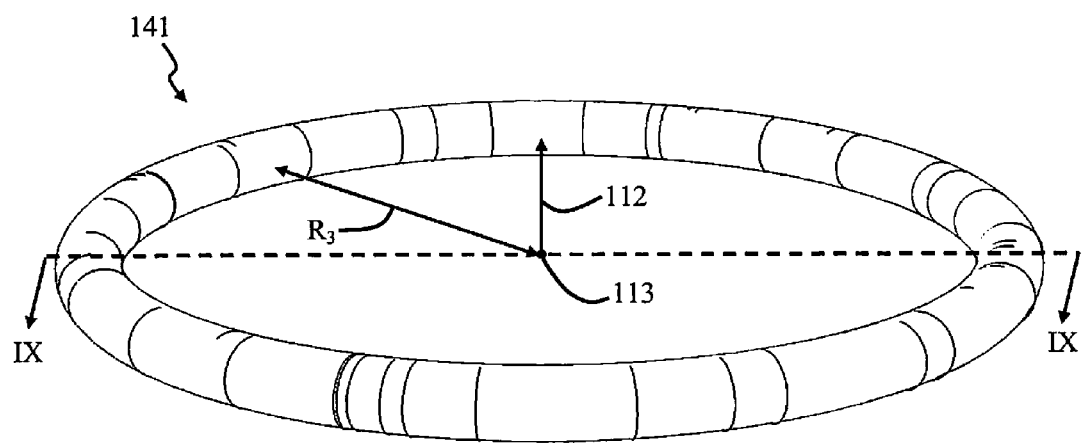
FIG. 9a is a perspective view of an elastomeric sealing ring included with the groove seal assembly of FIG. 8b.
Figure 9B:
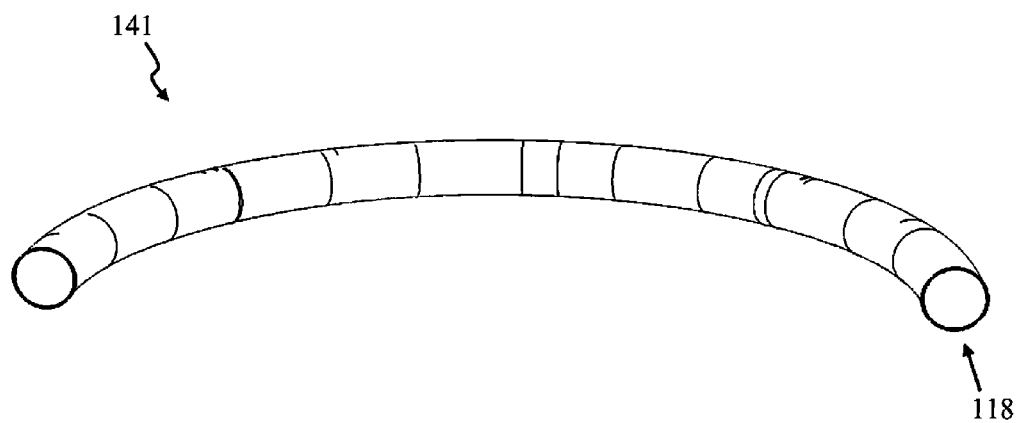

In this embodiment, groove seal assembly 116 includes an elastomeric sealing ring 141. FIG. 9a is a perspective view of one embodiment of elastomeric sealing ring 141, and FIG. 9b is a cut-away perspective view of elastomeric sealing ring 141 of FIG. 9a taken along a cut-line IX-IX of FIG. 9a. The view of elastomeric sealing ring 141 in FIGS. 8b, 8c and 8d is taken in direction 118 of FIG. 9b. It should be noted that the cone seal assembly can be the same or similar to groove seal assembly 116.

Elastomeric sealing ring 141 is annular in shape and includes a central opening, which has an inner radius of $R_3$ (FIG. 9a). The central opening of elastomeric sealing ring 141 is sized and shaped to be received by lug groove 127, as shown in FIGS. 8b, 8c and 8d. Radius $R_3$ is less than radii $R_1$ and $R_2$ because the central opening of elastomeric sealing ring 141 is smaller than the central openings of elastomeric sealing ring 140 and rigid sealing ring 130. It should be noted that the inner radius of elastomeric sealing ring 141 can be determined in many different ways. In this embodiment, the inner radius of elastomeric sealing ring 141 is determined from center point 113, which is shown in FIG. 9a. It should also be noted that groove seal assembly 116 generally forms a static seal with cutting cone 102 when it is positioned in a lug groove, as in FIGS. 8b, 8c and 8d. However, groove seal assembly 116 generally forms a static seal with lug 101 (i.e. journal segment 101a) when it is positioned in a cone groove.

FIG. 8c is a close-up view of dual seal rotary earth bit 100c, with interstice seal assembly 117 extending through interstice 120, and groove seal assembly 116 extending through groove 127. In this embodiment, rigid sealing ring 130 is positioned so that shortened arm portion 132 extends between groove seal assembly 116 and lengthened arm portion 131. In this embodiment, rigid sealing ring 130 is positioned so that shortened arm portion end surface 138 is facing interface 128 and lengthened arm portion end surface 137 is facing opening 111. Shortened arm portion end surface 138 faces interface 128 to restrict the flow of lubricant from groove seal assembly 116 to elastomeric sealing ring 140.

FIG. 8d is a cut-away view of dual seal rotary earth bit 100c showing the positioning of rigid sealing ring 130 and elastomeric sealing ring 140 relative to rotation axis 112 when interstice seal assembly 117 is positioned in interstice 120. In this embodiment, rigid sealing ring 130 is positioned distance $D_1$ and from rotation axis 112. As mentioned above, distance $D_1$ can be determined in many different ways. In this embodiment, distance $D_1$ extends between center 113 and shortened arm portion dynamic surface 152, and corresponds with inner radius $R_1$ of rigid sealing ring 130, as shown in FIG. 4a.

In this embodiment, elastomeric sealing ring 140 is positioned distance $D_2$ from rotation axis 112. As mentioned above, distance $D_2$ can be determined in many different ways. In this embodiment, distance $D_2$ corresponds with inner radius $R_2$ of elastomeric sealing ring 140, as shown in FIG. 5a.

In this embodiment, elastomeric sealing ring 141 is positioned distance $D_3$ from rotation axis 112. Distance $D_3$ can be determined in many different ways. In this embodiment, distance $D_3$ corresponds with inner radius $R_3$ of elastomeric sealing ring 141, as shown in FIG. 9a.

It should be noted that distance $D_1$ is less than distance $D_2$ because, as discussed in more detail above, distance $R_1$ is less than distance $R_2$. Hence, elastomeric sealing ring 140 is positioned further away from rotation axis 112 than shortened arm portion 132. In particular, elastomeric sealing ring 140 is positioned further away from rotation axis 112 than shortened arm portion dynamic surface 152, shortened arm portion dynamic surface 153 and shortened arm portion end surface 138. Further, elastomeric sealing ring 140 is positioned further away from rotation axis 112 than axial interstice lug surface 124.

It should be noted that distance $D_3$ is less than distance $D_1$ because, as discussed in more detail above, distance $R_3$ is less than distance $R_1$. Hence, shortened arm portion 132 is positioned further away from rotation axis 112 than elastomeric sealing ring 141. In particular, shortened arm portion dynamic surface 152, shortened arm portion dynamic surface 153 and shortened arm portion end surface 138 are positioned further away from rotation axis 112 than elastomeric sealing ring 141. Further, axial interstice lug surface 124 is positioned further away from rotation axis 112 than elastomeric sealing ring 141.

Figure 8E:
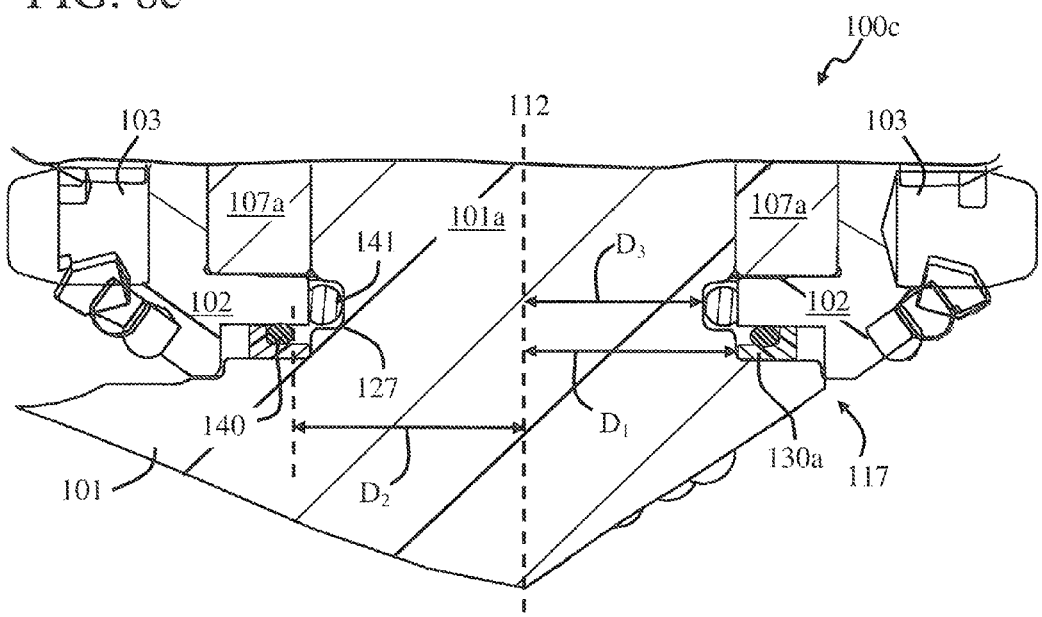
FIG. 8e is a cut-away view of a dual seal rotary earth bit having an interstice seal assembly in an interstice, and an elastomeric sealing ring.

FIG. 8e is a cut-away view of dual seal rotary earth bit 100c showing the positioning of a rigid sealing ring 130a and elastomeric sealing ring 140 relative to rotation axis 112 when interstice seal assembly 117 is positioned in interstice 120, and elastomeric sealing ring 141 is positioned in lug groove 127. Rigid sealing ring 130 includes lengthened arm portion 131 and shortened arm portion 132, wherein lengthened arm portion 131 and shortened arm portion 132 extend in axial and radial directions 105 and 106, respectively. However, in this embodiment, shortened arm portion 132 is spaced from journal segment 101a by lengthened arm portion 131. Further, in this embodiment, elastomeric sealing ring 140 is positioned between journal segment 101a and shortened arm portion 132.

Figure 8F:
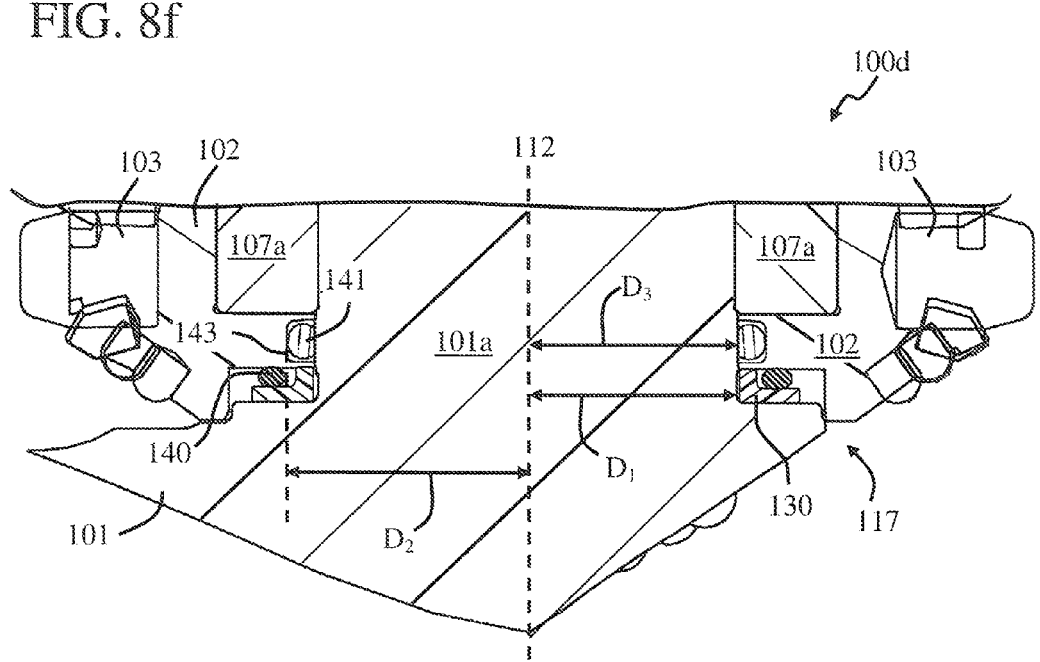
FIG. 8f is a cut-away view of a dual seal rotary earth bit having an interstice seal assembly in an interstice, and an elastomeric sealing ring in a cone groove.

FIG. 8f is a cut-away view of dual seal rotary earth bit 100d showing the positioning of rigid sealing ring 130 and elastomeric sealing ring 140 relative to rotation axis 112 when interstice seal assembly 117 is positioned in interstice 120, and elastomeric sealing ring 141 is positioned in a cone groove 143. In this embodiment, rigid sealing ring 130 is positioned distance $D_1$ and from rotation axis 112. In this embodiment, distance $D_1$ extends between center 113 and shortened arm portion dynamic surface 152, and corresponds with inner radius $R_1$ of rigid sealing ring 130, as shown in FIG. 4a.

In this embodiment, elastomeric sealing ring 140 is positioned distance $D_2$ from rotation axis 112. In this embodiment, distance $D_2$ corresponds with inner radius $R_2$ of elastomeric sealing ring 140, as shown in FIG. 5a.

In this embodiment, elastomeric sealing ring 141 is positioned distance $D_3$ from rotation axis 112. As mentioned above, distance $D_3$ can be determined in many different ways. In this embodiment, distance $D_3$ corresponds with inner radius $R_3$ of elastomeric sealing ring 141, as shown in FIG. 9a. In this embodiment, distance $D_3$ is about equal to distance $D_1$. However, in some embodiments, distance $D_3$ is less than distance $D_1$. For example, in some embodiments, distance $D_3$ is between about 0.001 inches to about 0.050 inches less than distance $D_1$.

FIG. 10a is a flow diagram of a method 200 of providing a seal for an earth bit. In this embodiment, method 200 includes a step 201 of providing a lug, and a step 202 of providing a seal assembly. Method 200 includes a step 203 of positioning the seal assembly so it forms a dynamic seal with a radial interstice lug surface of the lug. The seal assembly includes a rigid sealing ring having lengthened and shortened arm portions, wherein the lengthened arm portion engages the radial interstice lug surface.

It should be noted that method 200 can include many other steps. For example, in some embodiments, method 200 includes positioning the rigid sealing ring so the shortened arm portion extends along an axial interstice lug surface of the lug. In some embodiments, method 200 includes positioning the rigid sealing ring so the lengthened arm portion extends outwardly from the shortened arm portion. In some embodiments, method 200 includes positioning an elastomeric sealing ring so the lengthened arm portion is between the elastomeric sealing ring and radial interstice lug surface. In some embodiments, method 200 includes mounting a cutting cone with the lug so the rigid sealing ring and elastomeric sealing ring extend through an interstice. In some embodiments, method 200 includes energizing the lengthened arm portion against the radial interstice lug surface in response to mounting a cutting cone with the lug. In some embodiments, method 200 includes moving the elastomeric sealing ring from an uncompressed condition to a compressed condition in response to mounting a cutting cone with the lug. In some embodiments, method 200 includes positioning a groove seal assembly so it extends through a groove of the lug.

FIG. 10b is a flow diagram of a method 210 of providing a seal for an earth bit. In this embodiment, method 210 includes a step 211 of providing a lug. Method 210 includes a step 212 of positioning a rigid sealing ring so it forms a dynamic sealing surface with a radial interstice lug surface of the lug. The rigid sealing ring has lengthened and shortened arm portions. Method 210 includes a step 213 of positioning an elastomeric sealing ring so it engages the rigid sealing ring. The elastomeric sealing ring energizes the lengthened arm portion against the radial interstice lug surface. The elastomeric sealing ring energizes the lengthened arm portion against the radial interstice lug surface in response to mounting a cutting cone with the lug.

In some embodiments, the shortened arm portion extends between the elastomeric sealing ring and an axial interstice lug surface of the lug. The lengthened arm portion extends outwardly from the shortened arm portion. Further, in some embodiments, the elastomeric sealing ring engages the lengthened arm portion and a radial interstice cone surface of the cutting cone. In some embodiments, the elastomeric sealing ring moves from an uncompressed condition to a compressed condition in response to being engaged by the lengthened arm portion and radial interstice cone surface. In some embodiments, the interstice seal assembly extends through an interstice bounded by the radial interstice lug surface and radial interstice cone surface. In some embodiments, the rigid sealing ring includes a notch which faces an intersection between axial and radial interstice cone surfaces of the cutting cone.

It should be noted that method 210 can include many other steps. For example, in some embodiments, method 210 includes a step of positioning a groove seal assembly so it extends through a groove of the lug. In these embodiments, the shortened arm portion extends away from the radial interstice lug surface and towards the groove seal assembly. In some embodiments, method 210 includes positioning a groove seal assembly so it extends through a groove of the cutting cone.

Figure 11A:
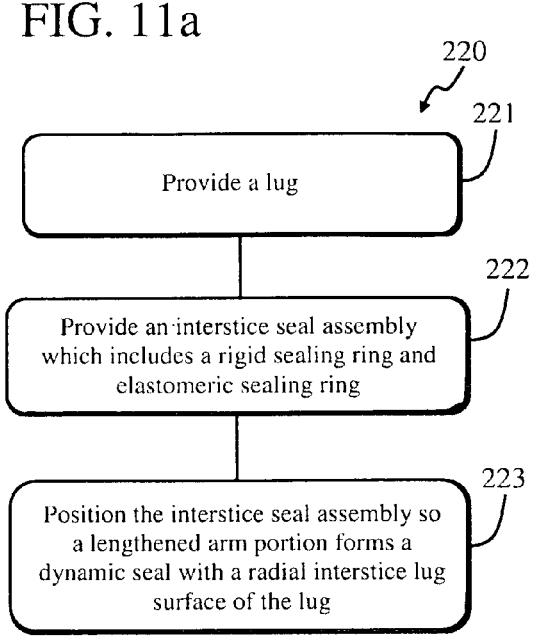
FIGS. 11a and 11b are flow diagrams of methods of manufacturing an earth bit.

FIG. 11a is a flow diagram of a method 220 of manufacturing an earth bit. In this embodiment, method 220 includes a step 221 of providing a lug. Method 220 includes a step 222 of providing an interstice seal assembly which includes a rigid sealing ring and elastomeric sealing ring. The rigid sealing ring includes lengthened and shortened arm portions, wherein the lengthened arm portion extends outwardly from the shortened arm portion. Further, the rigid sealing ring has an L-shaped cross-sectional area and the lengthened arm portion is longer than the shortened arm portion. It should be noted that, in general, the interstice seal assembly can be manufactured by the end user, or provided to the end user already manufactured. Method 220 includes a step 223 of positioning the interstice seal assembly so the lengthened arm portion forms a dynamic seal with a radial interstice lug surface of the lug.

Method 220 can include many other steps. For example, in some embodiments, method 220 includes a step of positioning the elastomeric sealing ring so that the lengthened arm portion is positioned between the elastomeric sealing ring and radial interstice lug surface. In these embodiments, method 220 can include a step of mounting a cutting cone with the lug. The step of mounting the cutting cone with the lug can include engaging the elastomeric sealing ring with the cutting cone so that the elastomeric sealing ring energizes the lengthened arm portion against the radial interstice lug surface. The step of mounting the cutting cone with the lug can include engaging the elastomeric sealing ring with the cutting cone so that the elastomeric sealing ring moves from an uncompressed condition to a compressed condition. It should be noted that, in general, the cutting cone can be manufactured by the end user, or provided to the end user already manufactured. In some embodiments, method 220 includes positioning a groove seal assembly so it extends through a groove of the lug.

Further, the step of mounting the cutting cone with the lug can include engaging the elastomeric sealing ring with a radial interstice cone surface of the cutting cone so that the elastomeric sealing ring energizes the lengthened arm portion against the radial interstice lug surface. The step of mounting the cutting cone with the lug can include engaging the elastomeric sealing ring with a radial interstice cone surface of the cutting cone so that the elastomeric sealing ring moves from an uncompressed condition to a compressed condition.

It should be noted that the step of mounting the cutting cone with the lug includes forming an interstice, and the interstice seal assembly extends through the interstice. In particular, the rigid sealing ring and elastomeric sealing ring extend through the interstice. The interstice is bounded by the radial interstice lug surface and radial interstice cone surface, as well as an axial interstice lug surface and axial interstice cone surface. Further, the elastomeric sealing ring is bounded by the lengthened and shortened arm portions of the rigid sealing ring, as well as the radial interstice cone surface and axial interstice cone surface.

Figure 11B:
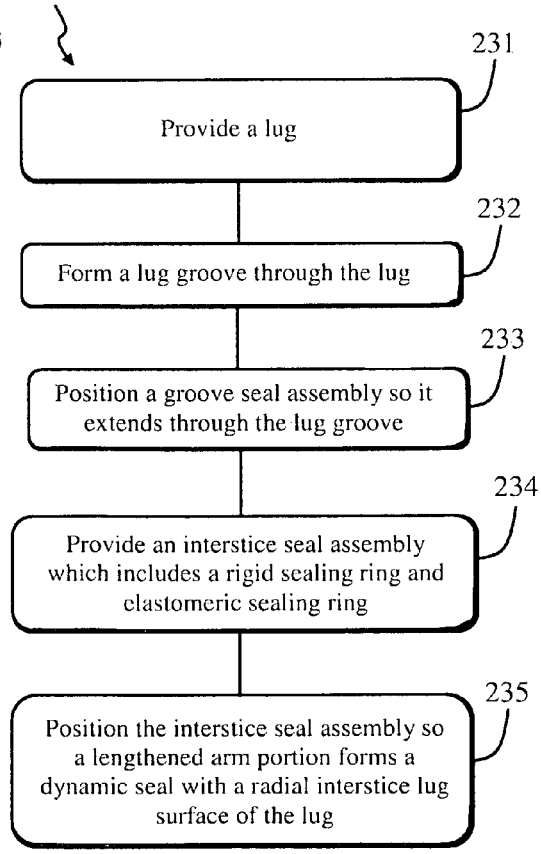

FIG. 11b is a flow diagram of a method 230 of manufacturing an earth bit. In this embodiment, method 230 includes a step 231 of providing a lug, and a step 232 of forming a lug groove through the lug. In particular, the lug groove is formed through a journal segment of the lug. It should be noted that, in some embodiments, the lug is provided to the end user with the lug groove already formed. Method 230 includes a step 233 of positioning a groove seal assembly so it extends through a lug groove.

Method 230 includes a step 234 of providing an interstice seal assembly which includes a rigid sealing ring and elastomeric sealing ring. The rigid sealing ring includes lengthened and shortened arm portions, wherein the lengthened arm portion extends outwardly from the shortened arm portion. Further, the rigid sealing ring has an L-shaped cross-sectional area and the lengthened arm portion is longer than the shortened arm portion. Method 230 includes a step 235 of positioning the interstice seal assembly so the lengthened arm portion forms a dynamic seal with a radial interstice lug surface of the lug.

Method 230 can include many other steps. For example, in some embodiments, method 230 includes positioning a groove seal assembly so it extends through a groove of the lug. In some embodiments, method 230 includes a step of positioning the elastomeric sealing ring so that the lengthened arm portion is positioned between the elastomeric sealing ring and radial interstice lug surface. In these embodiments, method 230 can include a step of mounting a cutting cone with the lug. The step of mounting the cutting cone with the lug can include engaging the elastomeric sealing ring with the cutting cone so that the elastomeric sealing ring energizes the lengthened arm portion against the radial interstice lug surface. The step of mounting the cutting cone with the lug can include engaging the elastomeric sealing ring with the cutting cone so that the elastomeric sealing ring moves from an uncompressed condition to a compressed condition.

Further, the step of mounting the cutting cone with the lug can include engaging the elastomeric sealing ring with a radial interstice cone surface of the cutting cone so that the elastomeric sealing ring energizes the lengthened arm portion against the radial interstice lug surface. The step of mounting the cutting cone with the lug can include engaging the elastomeric sealing ring with a radial interstice cone surface of the cutting cone so that the elastomeric sealing ring moves from an uncompressed condition to a compressed condition.

It should be noted that the step of mounting the cutting cone with the lug includes forming an interstice. The interstice seal assembly extends through the interstice. In particular, the rigid sealing ring and elastomeric sealing ring extend through the interstice. The interstice is bounded by the radial interstice lug surface and radial interstice cone surface, as well as an axial interstice lug surface and axial interstice cone surface. Further, the elastomeric sealing ring is bounded by the lengthened and shortened arm portions of the rigid sealing ring, as well as the radial interstice cone surface and axial interstice cone surface.

It should be noted that the steps of methods 200, 210, 220 and 230 can be carried out in many different orders. Further, the steps of methods 200, 210, 220 and 230 can be combined with each other in many different ways. It should also be noted that, in the embodiments discussed herein, the lug can be manufactured by the end user, or provided to the end user already manufactured. Further, in the embodiments discussed herein, the seal assembly can be manufactured and/or assembled by the end user, or provided to the end user already manufactured and/or assembled.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. An earth bit, comprising:
a lug;
a cutting cone carried by the lug; and
a seal assembly which forms a dynamic seal with a radial interstice lug surface of the lug, the seal assembly including a rigid sealing ring having lengthened and shortened arm portions and a separate elastomeric sealing ring, wherein the shortened arm portion is positioned between the elastomeric sealing ring and an axial interstice lug surface of the lug, the rigid sealing ring having a space between the shortened arm portion and the axial interstice lug face wherein the shortened arm portion does not form a seal, and the lengthened arm portion engages the radial interstice lug surface and the elastomeric sealing ring energizes the lengthened arm portion against the radial interstice lug surface, and wherein the shortened arm portion includes an end surface exposed to a radial interstice cone surface.

2. The bit of claim 1, wherein the elastomeric sealing ring is positioned between the lengthened arm portion and a radial interstice cone surface of the cutting cone.

3. The bit of claim 1, wherein the shortened arm portion is positioned towards an axial interstice lug surface of the lug, and the lengthened arm portion-extends outwardly from the shortened arm portion.

4. The bit of claim 3, wherein an intersection of the lengthened and shortened arm portions faces an intersection of the radial and axial interstice lug surfaces.

5. The bit of claim 3, wherein the shortened arm forms a dynamic seal with the axial interstice lug surface.

6. The bit of claim 3, wherein the lengthened arm forms a dynamic seal with an axial interstice lug surface.

7. The bit of claim 1, further including a groove seal assembly extending through a groove of the lug.

8. An earth bit, comprising:
a lug;
a cutting cone carried by the lug; and
an interstice seal assembly which forms a dynamic seal with a radial interstice lug surface of the lug, the interstice seal assembly including a rigid sealing ring having lengthened and shortened arm portions, and a separate elastomeric sealing ring, wherein the shortened arm portion is positioned between the elastomeric sealing ring and an axial interstice lug surface of the lug, the shortened arm portion being spaced from the axial interstice lug surface so it does not form a seal and the elastomeric sealing ring energizes the lengthened arm portion against the radial interstice lug surface, and wherein the shortened arm portion includes an end surface facing and spaced from a radial interstice cone surface, and wherein the end surface of the shortened arm portion is exposed to a radial interstice cone surface.

9. The bit of claim 8, wherein the shortened arm portion extends between the elastomeric sealing ring and an axial interstice lug surface of the lug.

10. The bit of claim 8, wherein the rigid sealing ring includes a notch which faces an intersection between axial and radial interstice cone surfaces of the cutting cone.

11. The bit of claim 8, wherein the elastomeric sealing ring engages the lengthened arm portion and a radial interstice cone surface of the cutting cone.

12. The bit of claim 11, wherein the elastomeric sealing ring moves from an uncompressed condition to a compressed condition in response to being engaged by the lengthened arm portion and radial interstice cone surface.

13. The bit of claim 11, wherein the interstice seal assembly extends through an interstice bounded by the radial interstice lug and cone surfaces.

14. The bit of claim 8, further including a groove seal assembly extending through a groove of the lug.

15. The bit of claim 14, wherein the shortened arm portion extends away from the radial interstice lug surface and towards the groove seal assembly.

16. A method of providing a seal for an earth bit, comprising:
providing a lug;
positioning a seal assembly so it forms a dynamic seal with a radial interstice lug surface of the lug and forms a space between the seal assembly and an axial interstice lug surface, wherein the seal assembly includes a rigid sealing ring having lengthened and shortened arm portions, the lengthened arm portion engaging the radial interstice lug surface and the shortened arm portion being spaced from the axial interstice lug surface so it does not form a seal, and wherein the shortened arm portion includes an end surface facing and spaced from a radial interstice cone surface, and wherein the end surface of the shortened arm portion is exposed to a radial interstice cone surface.

17. The method of claim 16, further including positioning the rigid sealing ring so the shortened arm portion extends along an axial interstice lug surface of the lug.

18. The method of claim 16, further including positioning an elastomeric sealing ring so the lengthened arm portion is between the elastomeric sealing ring and radial interstice lug surface.

19. The method of claim 18, further including mounting a cutting cone with the lug so the rigid sealing ring and elastomeric sealing ring extend through an interstice.

20. The method of claim 18, further including energizing the lengthened arm portion against the radial interstice lug surface in response to mounting a cutting cone with the lug.

21. The method of claim 18, further including moving the elastomeric sealing ring from an uncompressed condition to a compressed condition in response to mounting a cutting cone with the lug.

22. The method of claim 16, further including positioning a groove seal assembly so it extends through a groove of the lug.

* * * * *